(12) United States Patent
Wang et al.

(10) Patent No.: US 11,162,791 B2
(45) Date of Patent: Nov. 2, 2021

(54) METHOD AND SYSTEM FOR POINT OF SALE ORDERING

(71) Applicant: InvenSense, Inc., San Jose, CA (US)

(72) Inventors: Da Wang, Calgary (CA); Hussein Sahli, Calgary (CA); Jacques Georgy, Calgary (CA); Tao Li, Calgary (CA); Sheng Mao, Calgary (CA)

(73) Assignee: InvenSense, Inc., San Jose, CA (US)

( * ) Notice: Subject to any disclaimer, the term of this patent is extended or adjusted under 35 U.S.C. 154(b) by 490 days.

(21) Appl. No.: 15/167,036

(22) Filed: May 27, 2016

(65) Prior Publication Data

US 2017/0178102 A1 Jun. 22, 2017

Related U.S. Application Data

(60) Provisional application No. 62/270,809, filed on Dec. 22, 2015.

(51) Int. Cl.
| | |
|---|---|
| *G06Q 20/20* | (2012.01) |
| *G01C 21/20* | (2006.01) |
| *G06Q 30/06* | (2012.01) |
| *H04L 29/08* | (2006.01) |
| *G01C 21/16* | (2006.01) |

(52) U.S. Cl.
CPC .......... *G01C 21/16* (2013.01); *G01C 21/206* (2013.01); *G06Q 20/202* (2013.01); *G06Q 30/0635* (2013.01); *G06Q 30/0639* (2013.01); *H04L 67/18* (2013.01); *G06Q 20/20* (2013.01)

(58) Field of Classification Search
CPC ............ G06Q 20/202; G06Q 30/0635; G06Q 30/0639; G01C 21/206; G06F 17/30241; H04L 67/18
See application file for complete search history.

(56) References Cited

U.S. PATENT DOCUMENTS

| | | | | |
|---|---|---|---|---|
| 9,147,208 | B1* | 9/2015 | Argue | G06Q 30/06 |
| 2002/0161651 | A1* | 10/2002 | Godsey | G06Q 20/202 |
| | | | | 705/22 |
| 2008/0165053 | A1* | 7/2008 | Liu | G01S 19/44 |
| | | | | 342/357.27 |
| 2009/0224977 | A1* | 9/2009 | Bonner | G01S 5/02 |
| | | | | 342/378 |
| 2013/0282520 | A1* | 10/2013 | Tapley | G06Q 30/0641 |
| | | | | 705/26.8 |
| 2014/0256356 | A1* | 9/2014 | Shen | H04W 4/023 |
| | | | | 455/456.3 |
| 2014/0343846 | A1* | 11/2014 | Goldman | G05D 1/0272 |
| | | | | 701/525 |
| 2015/0281910 | A1* | 10/2015 | Choudhury | G01S 5/021 |
| | | | | 455/456.1 |

* cited by examiner

*Primary Examiner* — Mathew Franklin Gordon
(74) *Attorney, Agent, or Firm* — Bay Area Technology Law Group PC

(57) ABSTRACT

Anchor points associated with point of sale information may be ordered by deriving a trajectory for the portable device, associating known positions of the anchor points with a map encompassing the trajectory, characterizing turns of the trajectory, generating candidate paths by comparing the characterized turns to the map, selecting a solution path that corresponds to the anchor points and ordering the anchor points based at least in part on the solution path.

47 Claims, 13 Drawing Sheets

METHOD AND SYSTEM FOR POINT OF SALE ORDERING

CROSS-REFERENCE TO RELATED APPLICATIONS

This application claims priority from and benefit of U.S. Provisional Patent Application Ser. No. 62/270,809, filed Dec. 22, 2015, which is entitled "POINTS OF SALE ANCHOR POINTS ORDERING," which is assigned to the assignee hereof and is incorporated by reference in its entirety.

FIELD OF THE PRESENT DISCLOSURE

The present disclosure relates to a method and system for ordering point of sale data using sensor data for a device within a platform (such as for example person, vehicle, or vessel), wherein the device can be strapped or non-strapped to the platform, and wherein in case of non-strapped mobility of the device may be constrained or unconstrained within the platform, and wherein the device can be tilted to any orientation.

BACKGROUND

Portable electronic devices, such as those configured to be handheld or otherwise associated with a user, are employed in a wide variety of applications and environments. Increasingly, such devices are equipped with one or more sensors or other systems for determining the position or motion of the portable device. Notably, devices such as smartphones, tablets, smart watches or other portable devices may feature Global Navigation Satellite Systems (GNSS) receivers, low cost Micro Electro-Mechanical Systems (MEMS) inertial sensors, barometers and magnetometers. GNSS and multi-sensors can be integrated to provide promising positioning results in most outdoor environments. However, some mass market applications require seamless positioning capabilities in all kinds of environments such as malls, offices or underground parking lots. In the absence of GNSS signals in indoor environments, the conventional strapdown Inertial Navigation System (SINS) that uses low cost inertial sensors, suffers significant performance degradation due to the accumulated sensor drifts and bias. As such, positioning technologies relying solely on motion sensors may not satisfy all requirements for seamless indoor and outdoor navigation applications.

Pedestrian Dead Reckoning (PDR) is an example of a technique for indoor/outdoor positioning, and has become the focus of industrial and academic research recently. Similar to the SINS, PDR accumulates successive displacement from a known starting point to derive the position. This displacement (step length) can be estimated with various algorithms within a certain accuracy using the inertial sensor measurements. The position error using step lengths from PDR accumulates much slower than that from the accelerometer derived displacement from SINS. The PDR shows improved performance over SINS without GNSS updates. However, PDR still lacks robustness because of the accumulated heading error. Conventional methods of complementing sensor-based navigation include systems that are based on trilateration of received wireless signals, such as WiFi™ access points or dedicated beacons. As will be recognized, such methods involve considerable additional equipment and deployment overhead.

The performance of SINS and/or PDR techniques may be significantly improved if corrections are available during the positioning trajectory. For example, a source of position information that may be used to correct a sensor-based solution may be termed an "anchor point," which generally means a source of position information that is known without reference to motion sensor data. One potential resource for deriving anchor points that may be used to supplement a position solution exists when a user carries the portable device through a retail venue. By analyzing point of sale data, it may be determined which items were purchased by the user. Accordingly, each purchased item may constitute an anchor point if the absolute position of the item within the retail venue is known. Notably, each product may have a designated location on shelves or other display features within the retail venue that may be stored in a database maintained by retail venue or provided by third parties that provide store maps and product shelf databases. Other similar services may also be employed. An interaction between the user and each item purchased may be assumed, involving the user taking the item from its shelf location in association with buying it, indicating the user was at the location corresponding to the item's position in the retail venue.

The point of sale information does not inherently determine the order or the time the user was positioned at the anchor points. Without ordering information, the anchor points may be used to reject possible routes indicated by the motion sensor data. However, it may not be possible to directly integrate the location information associated with such anchor points with the sensor-based navigation. By employing the techniques of this disclosure, anchor points from point of sale information may be ordered and/or time-correlated with a trajectory of the user derived from motion sensor data.

SUMMARY

As will be described in detail below, this disclosure includes a method for ordering a plurality of anchor points based at least in part on a navigation solution from a portable device. The method may involve obtaining sensor data for the portable device representing motion of the portable device at a plurality of epochs over a first period of time, deriving a trajectory for the portable device for the first period of time, obtaining a map of a venue encompassing the trajectory, obtaining a plurality of anchor points associated with the trajectory, associating known positions of the plurality of anchor points with the map, characterizing turns of the trajectory, generating a plurality of candidate paths by comparing the characterized turns to the map, selecting a solution path from the plurality of candidate paths that corresponds to the plurality of anchor points and ordering the plurality of anchor points based at least in part on the solution path.

This disclosure also includes a system for ordering a plurality of anchor points that may include a portable device comprising an integrated sensor assembly, configured to output sensor data representing motion of the portable device for the portable device at a plurality of epochs over a first period of time, and a communications module for transmitting information corresponding to the epochs, and remote processing resources configured to receive the information from the portable device and having a processor configured to implement an ordering module to obtain a map of a venue encompassing a trajectory derived for the portable device for the first period of time, obtain a plurality of anchor points associated with the trajectory, associate known positions of the plurality of anchor points with the map, characterize turns of the trajectory, generate a plurality of candidate paths by comparing the characterized turns to the map, select a solution path from the plurality of candidate paths that corresponds to the plurality of anchor points and order the plurality of anchor points based at least in part on the solution path.

This disclosure also includes a server for ordering a plurality of anchor points comprising processing resources configured to implement an ordering module to obtain a map of a venue encompassing a trajectory derived for a portable device from sensor data representing motion of the portable device at a plurality of epochs over a first period of time, wherein the mobility of the portable device is constrained or unconstrained within a platform and wherein the portable device may be tilted to any orientation, obtain a plurality of anchor points associated with the trajectory, associate known positions of the plurality of anchor points with the map, characterize turns of the trajectory, generate a plurality of candidate paths by comparing the characterized turns to the map, select a solution path from the plurality of candidate paths that corresponds to the plurality of anchor points and order the plurality of anchor points based at least in part on the solution path.

This disclosure also includes a portable device for ordering a plurality of anchor points comprising an integrated sensor assembly, configured to output sensor data representing motion of the portable device for the portable device at a plurality of epochs over a first period of time, wherein the mobility of the portable device is constrained or unconstrained within a platform and wherein the portable device may be tilted to any orientation, and a communications module for transmitting information corresponding to the epochs and a navigation module configured to derive a trajectory for the portable device for the first period of time based at least in part on the sensor data, obtain a map of a venue encompassing a trajectory derived for the portable device for the first period of time, obtain a plurality of anchor points associated with the trajectory, associate known positions of the plurality of anchor points with the map, characterize turns of the trajectory, generate a plurality of candidate paths by comparing the characterized turns to the map, select a solution path from the plurality of candidate paths that corresponds to the plurality of anchor points and order the plurality of anchor points based at least in part on the solution path.

DETAILED DESCRIPTION

Figure 1:
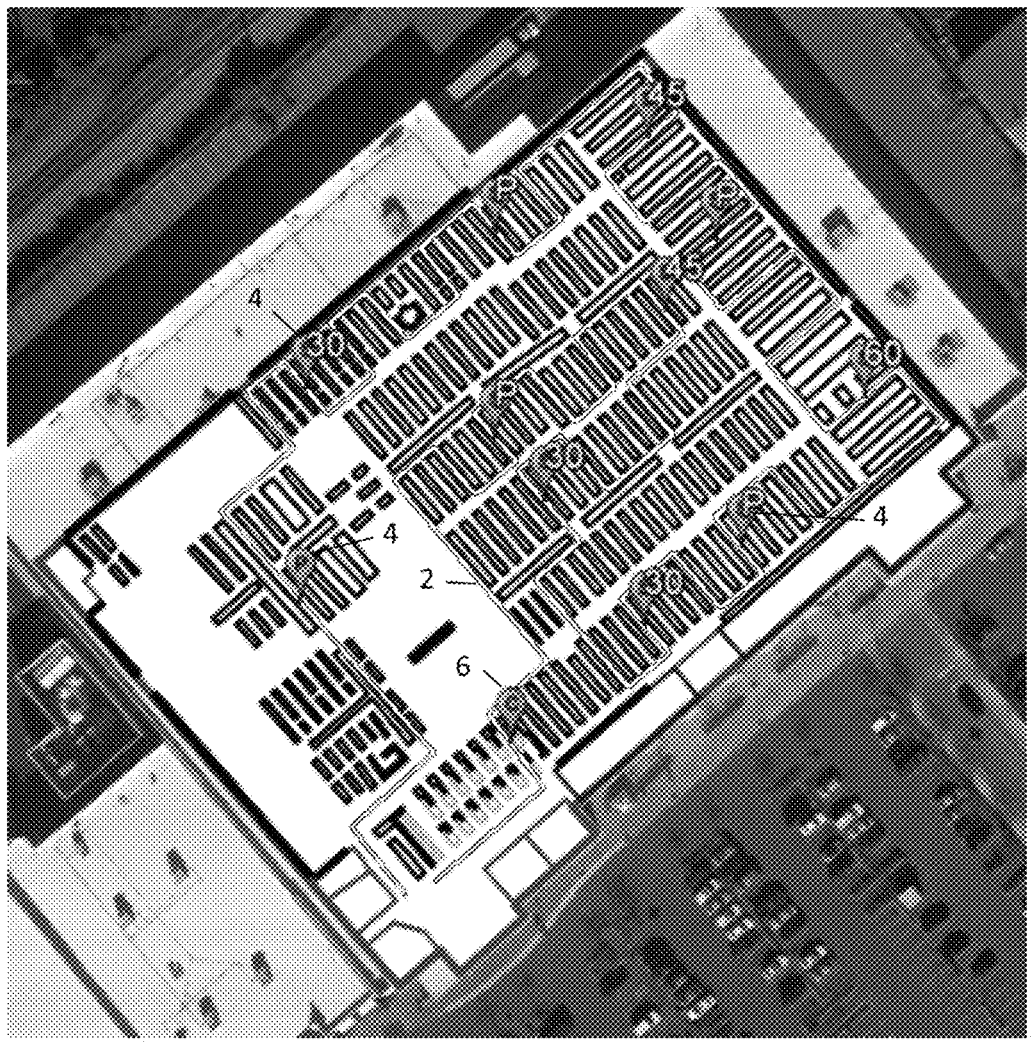
FIG. 1 is a schematic diagram of a retail venue having anchor points determined from point of sale information according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

The techniques of this disclosure are directed to navigation solutions for a portable device that may be associated with a platform that transports the device. The platform may be the user, as in the example of a smartphone being carried as a user walks, runs, swims or otherwise undergoes locomotion. The platform may also be considered a vehicle or vessel that conveys the user and/or the portable device. In some embodiments, the platform may be a shopping cart or other aid associated with retail transactions. To illustrate, the portable device may be incorporated into the shopping cart itself or may be carried in the shopping cart, either loose or contained within another carrier, such as a purse or the like. Although the portable device generally maybe transported or conveyed in the direction of movement of the platform, its orientation may not be constrained. Returning to the example of the smartphone, it may be held in the user's hand and employed in a variety of orientations or carried in a pocket, holster, bag or other manners. In other examples, the portable device may be strapped to the platform, such as with a vehicle mount, or may be non-strapped. When non-strapped, the mobility of the device may be constrained or unconstrained within the platform and as a result, circumstances may exist such that the device can be tilted to any orientation with respect to the user or platform.

As an illustration only and without limitation, a user may be carrying a portable device while traversing a venue, such as shopping within a store. During this time, the portable device may derive a navigation solution comprising information about the position, orientation and or movement of the portable device of multiple epochs, thereby representing the trajectory of the user through the store. In one aspect, the portable device may use any suitable real-time technique to generate such navigation solution, including an inertial navigation routine employing dead reckoning, a reference-based location service utilizing a source of absolute navigation information, a location beaconing system or any other suitable technique, or combinations thereof. Although of substantial benefit, these real-time solution may nonetheless suffer from inaccuracies or limitations. Again without limitation, an inertial dead reckoning system may be subject to drift over time due to the characteristics of currently-employed sensors or a source of absolute navigation information such as a global navigation satellite system (GNSS) may suffer from poor reception in indoor environments. Accordingly, the techniques of this disclosure are directed to the ordering of a plurality of anchor points derived from point of sale information. Once ordered, the anchor points may be used as absolute information or as an absolute position update to a sensor-based navigation solution or to a map-matching solution. Ordered anchor points may also be used to suggest possible routes of the trajectory or to segment the trajectory into more manageable portions between known positions established by the anchor points. The anchor points may also be time tagged and their known position can be correlated with positions derived from the motion sensor data.

As one illustrative example, a user associated with a portable device that provides motion sensor data may follow a trajectory through a retail venue, as schematically indicated in FIG. 1. The actual trajectory of the user is represented by outline track 2 and the location of each unordered point of sale anchor point is designated by pins 4. When the user purchases items at the retail venue, a receipt is generated that indicates the products that were bought. As noted above, the location of each item within the retail venue may be obtained from the retailer or from a third party. Thus, the location of each item purchased may have a known location (e.g. Cartesian coordinates) as indicated by pins 4. In some embodiments, one or more anchor points, such as pin 6, may be inherently ordered. Here, pin 6 corresponds to the register at which the user checked out and purchased the items selected over the course of the trajectory. Accordingly, it may be assumed that the checkout is the last anchor point. However, the point of sale information may not provide any inherent information about the order in which the anchor points represented by pins 4 were visited. By employing the techniques of this disclosure, the anchor points represented by pins 4 may be ordered.

Figure 2:
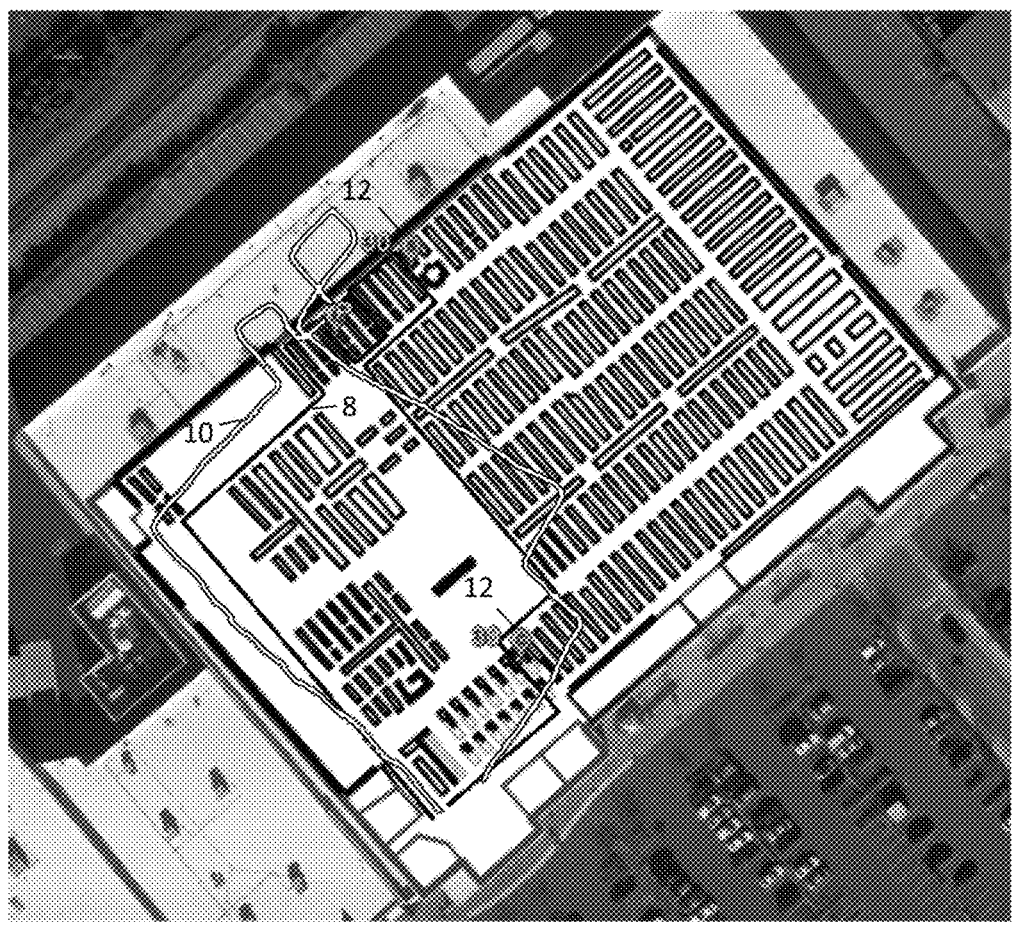
FIG. 2 is a schematic diagram of a trajectory of a user derived from motion sensor data in a retail venue according to an embodiment.

Although navigation solutions for a portable device may drift over time as discussed above, the overall shape of the trajectory may have sufficient characteristics to allow it to compared to candidate paths representing possible routes through a venue. Correspondingly, a solution path may be selected from the candidate paths that appropriately incorporates any anchor points that are available for the trajectory. This aspect is illustrated in FIG. 2, which shows the reference trajectory of a user as black line track 8. The trajectory derived from motion sensor data is shown as outline track 10. While the absolute position indicated by the derived trajectory may be seen to drift, the shape of track 10 may be matched to track 8 and distinguish other possible routes that could have been taken. Upon selecting a solution path that corresponds to the actual route, any anchor points identified on the map, such as those indicated by pins 12, may be ordered by using the solution path.

Figure 3:
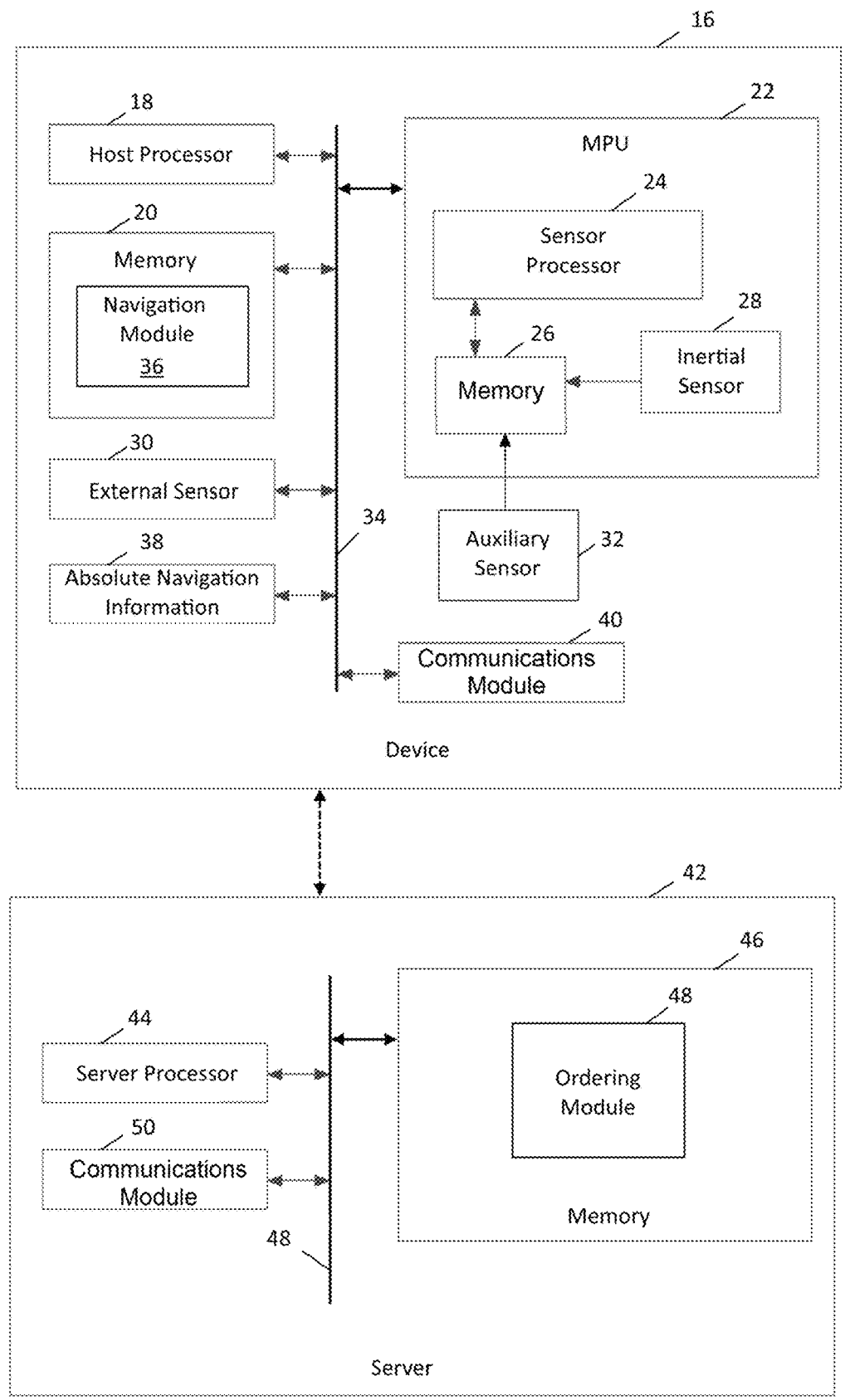
FIG. 3 is a schematic representation of functional blocks of a system for ordering anchor points according to an embodiment.

One representative system for ordering anchor points is schematically depicted in FIG. 3, with portable device 16 represented by high level schematic blocks. As will be appreciated, device 16 may be implemented as a device or apparatus, such as a handheld device that can be moved in space by a user and its motion, location and/or orientation in space therefore sensed. For example, such a handheld device may be a mobile phone (e.g., smartphone, cellular phone, a phone running on a local network, or any other telephone handset), tablet, personal digital assistant (PDA), video game player, video game controller, navigation device, wearable device (e.g., glasses, watch, belt clip), fitness tracker, virtual or augmented reality equipment, mobile internet device (MID), personal navigation device (PND), digital still camera, digital video camera, binoculars, telephoto lens, portable music, video or media player, remote control, or other handheld device, or a combination of one or more of these devices.

As shown, device 16 includes a host processor 18, which may be one or more microprocessors, central processing units (CPUs), or other processors to run software programs, which may be stored in memory 20, associated with the functions of device 16. Multiple layers of software can be provided in memory 20, which may be any combination of computer readable medium such as electronic memory or other storage medium such as hard disk, optical disk, etc., for use with the host processor 18. For example, an operating system layer can be provided for device 16 to control and manage system resources in real time, enable functions of application software and other layers, and interface application programs with other software and functions of device 16. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 16, and in some of those embodiments, multiple applications can run simultaneously.

Device 16 includes at least one sensor assembly, as shown here in the form of integrated motion processing unit (MPU™) 22 featuring sensor processor 24, memory 26 and inertial sensor 28. Memory 26 may store algorithms, routines or other instructions for processing data output by inertial sensor 28 and/or other sensors as described below using logic or controllers of sensor processor 24, as well as storing raw data and/or motion data output by inertial sensor 28 or other sensors. Inertial sensor 28 may be one or more sensors for measuring motion of device 16 in space. Depending on the configuration, MPU 22 measures one or more axes of rotation and/or one or more axes of acceleration of the device. In one embodiment, inertial sensor 28 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 24, or other processing resources of device 16, combines data from inertial sensor 28 to provide a six axis determination of motion. As desired, inertial sensor 28 may be implemented using Micro Electro Mechanical System (MEMS) to be integrated with MPU 22 in a single package. Exemplary details regarding suitable configurations of host processor 18 and MPU 22 may be found in co-pending, commonly owned U.S. patent application Ser. No. 11/774,488, filed Jul. 6, 2007, and Ser. No. 12/106,921, filed Apr. 11, 2008, which are hereby incorporated by reference in their entirety. Suitable implementations for MPU 22 in device 16 are available from InvenSense, Inc. of Sunnyvale, Calif.

Alternatively or in addition, device 16 may implement a sensor assembly in the form of external sensor 30. This is optional and not required in all embodiments. External sensor may represent one or more sensors as described above, such as an accelerometer and/or a gyroscope, which output data for use in deriving a navigation solution. As used herein, "external" means a sensor that is not integrated with MPU 22 and may be remote or local to device 16. Also alternatively or in addition, MPU 22 may receive data from an auxiliary sensor 32 configured to measure one or more aspects about the environment surrounding device 16. This is optional and not required in all embodiments. For example, a barometer and/or a magnetometer may be used to refine position determinations made using inertial sensor 28. In one embodiment, auxiliary sensor 32 may include a magnetometer measuring along three orthogonal axes and output data to be fused with the gyroscope and accelerometer inertial sensor data to provide a nine axis determination of motion. In another embodiment, auxiliary sensor 32 may also include a barometer to provide an altitude determination that may be fused with the other sensor data to provide a ten axis determination of motion. Although described in the context of one or more sensors being MEMS based, the techniques of this disclosure may be applied to any sensor design or implementation.

In the embodiment shown, host processor 18, memory 20, MPU 22 and other components of device 16 may be coupled through bus 34, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 16, such as by using a dedicated bus between host processor 18 and memory 20.

In one aspect, the various operations of this disclosure used to derive a navigation solution for portable device 16 may be implemented through navigation module 36 as a set of suitable instructions stored in memory 20 that may be read and executed by host processor 18. Navigation module 36 may employ a reference-based strategy, a self-contained strategy, or any combination of strategies to provide any desired degree of location awareness capabilities. For example, navigation module 36 may employ inertial navigation techniques utilizing sensor data, such as from inertial sensor 28, external sensor 30 and/or auxiliary sensor 32, as obtained for a current sensor epoch to derive a navigation solution for that epoch. Such techniques may involve dead reckoning or the like, and may determine an orientation for device 16, including values such as any roll, pitch, and azimuth (heading) angles. The navigation solutions derived by navigation module 36 represent contemporaneous determinations of position information for portable device 16. Although some transmission, some possible buffering, and processing time may be required, the results are at least near real time (there could be some possible latencies) and may use any information available up until the time the navigation solution is derived. Still further, navigation module 36 may also be configured to determine a motion mode that indicates the user's motion patterns, which may include without limitation, walking, driving, running, going up/down stairs, riding an elevator, walking/standing on an escalator, and other similar motion patterns. In some embodiments, navigation module 36 may employ a real-time map matching routine to aid the derivation of navigation solutions in a causal manner.

Navigation module 36 may also use a source of absolute navigation information 38, such as a Global Navigation Satellite System (GNSS) receiver, including without limitation the Global Positioning System (GPS), the Global Navigation Satellite System (GLONASS), Galileo and/or Beidou, as well as WiFi™ positioning, cellular tower positioning, Bluetooth™ positioning beacons or other similar methods when deriving a navigation solution. This is optional and not required in all embodiments. Navigation module 36 may also be configured to use information from a wireless communication protocol to provide a position determination using signal trilateration. Any suitable protocol, including cellular-based and wireless local area network (WLAN) technologies such as Universal Terrestrial Radio Access (UTRA), Code Division Multiple Access (CDMA) networks, Global System for Mobile Communications (GSM), the Institute of Electrical and Electronics Engineers (IEEE) 802.16 (WiMAX), Long Term Evolution (LTE), IEEE 802.11 (WiFi™) and others may be employed. Further, portable device 16 may also have a communications module 40 for transmitting and/or receiving information, including navigation solutions derived by navigation module 36.

Multiple layers of software may be employed as desired and stored in any combination of memory 20, memory 26, or other suitable location. For example, a motion algorithm layer can provide motion algorithms that provide lower-level processing for raw sensor data provided from the motion sensors and other sensors. A sensor device driver layer may provide a software interface to the hardware sensors of device 16. Further, a suitable application program interface (API) may be provided to facilitate communication between host processor 18 and MPU 22, for example, to transmit desired sensor processing tasks.

In this exemplary system, portable device 16 communicates raw sensor data or navigation solutions derived for a plurality of sensor epochs over a first period of time to server 42. Subsequent to the first period of time, server 42 may then receive anchor points associated with point of sale information and utilize the techniques of this disclosure to order the anchor points, based at least in part on a trajectory determined for portable device 16, either as determined by navigation module 36 or by server 42 as described below. Notably, in embodiments where portable device 16 transmits raw sensor data to server 42, navigation module 36 may be optional as no position determination need be made locally. One suitable architecture of server 42 is depicted using high level schematic blocks in FIG. 3, and may include server processor 44 that is in communication with memory 46 over bus 48. As will be described in further detail below, server processor 44 may execute instructions stored in memory 46 that are represented as functional blocks, including ordering module 48, which may perform the operations described in this disclosure to order anchor points by shape matching a trajectory to map information.

Server 42 may also include a communications module 50 to receive raw sensor data or navigation solutions for portable device 16 derived by navigation module 36. Communications module 50 may also receive point of sale information, such as items purchased by the user and the corresponding location of those items in the retail venue. Communications involving portable device 16 and server 42 may employ any suitable protocol. For example, a shorter range, low power communication protocol such as BLUETOOTH®, ZigBee®, ANT or a wired connection may be used or a longer range communication protocol, such as a transmission control protocol, internet protocol (TCP/IP) packet-based communication, accessed using a wireless local area network (WLAN), cell phone protocol or the like may be used. In general, the system depicted in FIG. 3 may embody aspects of a networked or distributed computing environment. Portable device 16 and server 42 may communicate either directly or indirectly, such as through multiple interconnected networks. As will be appreciated, a variety of systems, components, and network configurations, topologies and infrastructures, such as client/server, peer-to-peer, or hybrid architectures, may be employed to support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

As noted, portable device 16 may derive navigation solutions and server 42 may obtain anchor points from point of sale information and order those anchor points. However, any or all of the functions described as being performed may be performed by any number of discrete devices in communication with each other, or may be performed by portable device 16 itself in other suitable system architectures. For example, navigation module 36 may be configured to obtain anchor points from point of sale information and order those anchor points by performing the functions associated with ordering module 48. Accordingly, it should be appreciated that any suitable division of processing resources may be employed whether within one device or among a plurality of devices. Further, aspects implemented in software may include but are not limited to, application software, firmware, resident software, microcode, etc., and may take the form of a computer program product accessible from a computer-usable or computer-readable medium providing program code for use by or in connection with a computer or any instruction execution system, such as host processor 18, sensor processor 24, server processor 44, a dedicated processor or any other processing resources of portable device 16, server 42 or other remote processing resources, or may be implemented using any desired combination of software, hardware and firmware.

Figure 4:
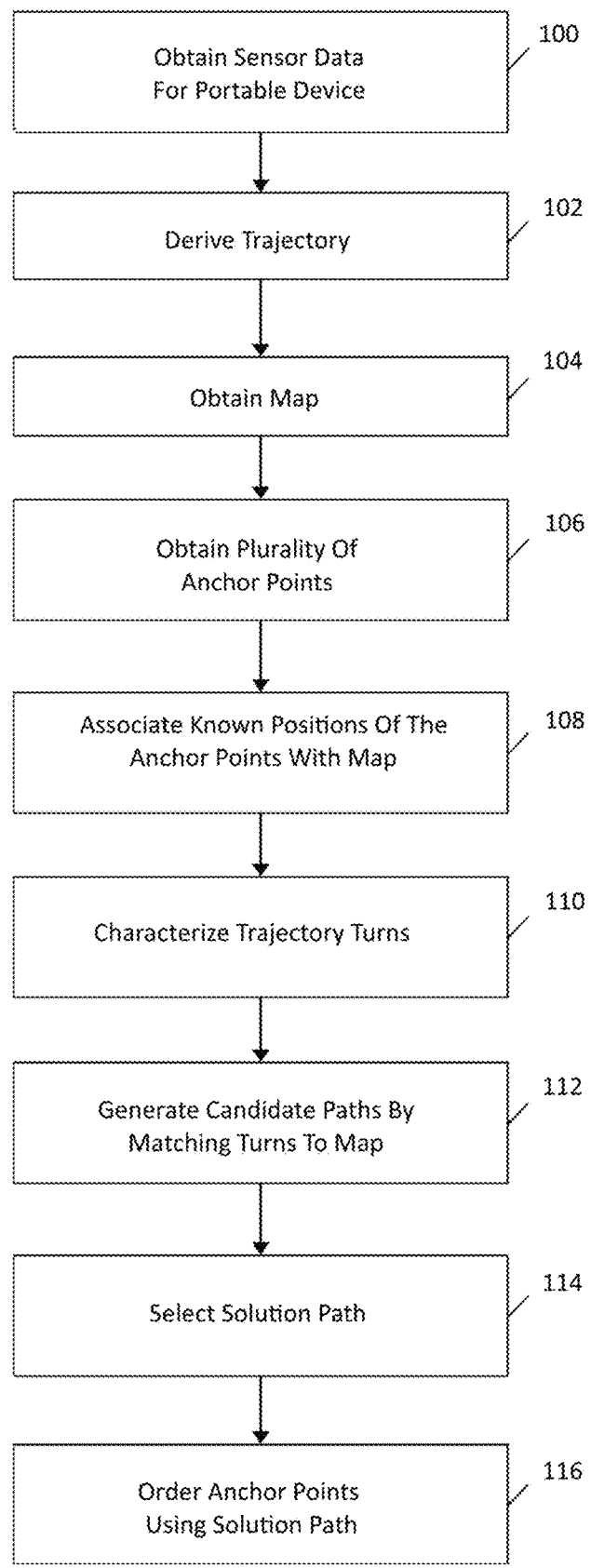
FIG. 4 is a schematic representation of routine for ordering anchor points according to an embodiment.

A representative routine involving the techniques of this disclosure is depicted in FIG. 4. Beginning with 100, sensor data may be obtained for a plurality of epochs over a given time period, such as from inertial sensor 28 and/or external sensor 30, for the portable device 16. Using the sensor data, navigation module 36 may derive navigation solutions at each sensor epoch to derive a trajectory in 102. Alternatively, the raw sensor data, the derived navigation solutions or both may be transmitted to remote processing resources, such as server 42. For example, the derivation of navigation solutions for each sensor epoch may be performed by navigation module 36 at portable device 16 or may be performed at server 42 using the raw sensor data for each sensor epoch as transmitted by portable device 16. A map may be obtained for a venue encompassing the trajectory in 104. As will be described below, the map may be a grid map, a geometric map or a combination. Map information may also be processed or transformed into a suitable grid and/or geometric map as warranted. In 106, a plurality of anchor points associated with the trajectory may be obtained by ordering module 48, such as from point of sale information as noted. Known positions of the plurality of anchor points may then be associated with the map in 108. Ordering module 48 may analyze the trajectory to characterize turns in 110. Next, a plurality of candidate paths may be generated by ordering module 48 in 112 by comparing the characterized turns to the map. In 114, a solution path from the plurality of candidate paths may be selected by ordering module 48 that corresponds to the plurality of anchor points. Correspondingly, the plurality of anchor points may be ordered in 116 based at least in part on the solution path.

In one aspect, characterizing turns of the trajectory may involve identifying pairs of sequential turns and a distance traveled between each pair of sequential turns. Each turn may include a start and an end and the distance traveled between a pair of sequential turns may be a distance between the end of a first turn and the start of a subsequent turn. The distance traveled between a pair of sequential turns may be determined based at least in part on step length.

In one aspect, characterizing turns of the trajectory may also involve determining a link for each pair of sequential turns, wherein the link comprises a portion of the trajectory having the distance traveled between the pair of sequential turns and a heading.

In one aspect, a turn may be identified based at least in part on a rate of heading change of the portable device exceeding a threshold. Heading information may be filtered before identifying a turn.

In one aspect, the start of the turn may be determined when the rate of heading change exceeds the threshold and the end of the turn may be determined when the rate of heading change falls below the threshold.

In one aspect, identifying a turn may be based at least in part on a detected fidgeting period and a change of heading during the fidgeting period. The start of the turn may be determined when the fidgeting period begins and the end of the turn may be determined when the fidgeting period ends.

In one aspect, identifying a turn may be based at least in part on characterizing an intersection between adjacent trajectory segments. Each trajectory segment may represent periods of straight line motion.

In one aspect, generating a candidate path may involve shape matching identified pairs of sequential turns and their associated link with the map. Shape matching may be based at least in part on the distance and heading of each link. Further, shape matching may also be based at least in part on a turning angle determined with respect to two sequential links.

In one aspect, an uncertainty measure may be associated with each of the ordered plurality of anchor points.

In one aspect, at least one anchor point of the plurality of anchor points may be associated with a position of the trajectory. A time for the at least one anchor point may be determined based at least in part on the associated position. An uncertainty measure may be associated with the determined time for the at least one anchor point.

In one aspect, at least one of the plurality of anchor points may be a point of sale.

In one aspect, a dwell period may be detected based at least in part on the sensor data and one of the anchor points may be correlated with the dwell period. The dwell period may correspond to a static motion characteristic or may correspond to a fidgeting motion characteristic.

In one aspect, deriving the trajectory may involve performing a forward processing operation over the first period of time.

In one aspect, deriving the trajectory may involve performing a backward processing operation over the first period of time.

In one aspect, deriving the trajectory may involve performing a forward processing operation and a backward processing operation over the first period of time.

In one aspect, deriving the trajectory may involve performing a forward processing operation, a backward processing operation over the first period of time, and a combination of the forward processing and backward processing.

In one aspect, deriving the trajectory may involve performing a smoothing operation over the first period of time.

In one aspect, deriving the trajectory may involve performing a backward smoothing operation over the first period of time.

In one aspect, deriving the trajectory may involve performing a multiple pass processing operation over the first period of time.

In one aspect, the obtained map may be transformed into a grid of connected traces and nodes. Transforming the obtained map may involve constructing a voronoi diagram. Each node may be equidistant from at least three map entities and each trace may be equidistant from two map entities. The nodes and traces may be supplemented to complete a candidate path around a map entity.

In one aspect, the obtained map may be transformed into a polygon based geometric map.

This disclosure may also involve a system for ordering a plurality of anchor points, including a portable device with an integrated sensor assembly, configured to output sensor data for the portable device representing motion of the portable device at a plurality of epochs over a first period of time, wherein the mobility of the portable device is constrained or unconstrained within a platform and wherein the portable device may be tilted to any orientation, and a communications module for transmitting information corresponding to the epochs and remote processing resources to receive the information from the portable device and having a processor to implement an ordering module to obtain a map of a venue encompassing a trajectory derived for the portable device for the first period of time, obtain a plurality of anchor points associated with the trajectory, associate known positions of the plurality of anchor points with the map, characterize turns of the trajectory, generate a plurality of candidate paths by comparing the characterized turns to the map, select a solution path from the plurality of candidate paths that corresponds to the plurality of anchor points and order the plurality of anchor points based at least in part on the solution path.

In one aspect, the information received by the remote processing resources may be sensor data for the portable device and the ordering module may derive the trajectory based at least in part on the sensor data.

In one aspect, the portable device further may have a navigation module to derive the trajectory based at least in part on the sensor data at the plurality of epochs and the communications module may transmit the trajectory.

This disclosure also pertains to a server for ordering a plurality of anchor points. The server may have processing resources implementing an ordering module to obtain a map of a venue encompassing a trajectory derived for a portable device from sensor data representing motion of the portable device at a plurality of epochs over a first period of time, wherein the mobility of the portable device is constrained or unconstrained within a platform and wherein the portable device may be tilted to any orientation, obtain a plurality of anchor points associated with the trajectory, associate known positions of the plurality of anchor points with the map, characterize turns of the trajectory, generate a plurality of candidate paths by comparing the characterized turns to the map, select a solution path from the plurality of candidate paths that corresponds to the plurality of anchor points and order the plurality of anchor points based at least in part on the solution path.

In one aspect, the server may receive sensor data for the portable device for the plurality of epochs and the ordering module may derive the trajectory based at least in part on the sensor data.

In one aspect, the server may receive the trajectory based at least in part on the sensor data at the plurality of epochs from the portable device.

Further, the techniques of this disclosure may be implemented using a portable device for ordering a plurality of anchor points.

In one aspect, the portable device may include an integrated sensor assembly that may output sensor data for the portable device representing motion of the portable device at a plurality of epochs over a first period of time, a navigation module to derive a trajectory for the portable device for the first period of time based at least in part on the sensor data, to obtain a map of a venue encompassing a trajectory derived for the portable device for the first period of time, to obtain a plurality of anchor points associated with the trajectory, to associate known positions of the plurality of anchor points with the map, to characterize turns of the trajectory, to generate a plurality of candidate paths by comparing the characterized turns to the map, to select a solution path from the plurality of candidate paths that corresponds to the plurality of anchor points and to order the plurality of anchor points based at least in part on the solution path.

In one aspect, the portable device may include an integrated sensor assembly, configured to output sensor data for the portable device representing motion of the portable device at a plurality of epochs over a first period of time, wherein the mobility of the portable device is constrained or unconstrained within a platform and wherein the portable device may be tilted to any orientation, and a communications module for transmitting information corresponding to the epochs.

In one aspect, the portable device may include an integrated sensor assembly, configured to output sensor data for the portable device representing motion of the portable device at a plurality of epochs over a first period of time, wherein the mobility of the portable device is constrained or unconstrained within a platform and wherein the portable device may be tilted to any orientation, a navigation module configured to derive a trajectory for the portable device for the first period of time based at least in part on the sensor data and a communications module for transmitting information corresponding to the epochs.

For each of the embodiments comprising a portable device, the sensor assembly may include an accelerometer and a gyroscope. The sensor assembly may be an inertial sensor implemented as a Micro Electro Mechanical System (MEMS).

Examples

The following examples describe comparing the shape of a trajectory derived from the motion sensor data to a map encompassing the trajectory in order to order the anchor points. Map information is processed to extract possible paths, which may then be compared to the trajectory shape as noted above. Accordingly, map information may initially be obtained from any suitable source, such as from on-line map service providers. As necessary, the map information may be processed into a form suitable for use, such as by forming a grid map, a geometric map or a combination. For example, the map information may be converted into an internal map data structure, where it may be saved into the local storage for future use without the overhead of downloading and processing it again if desired. Accordingly, processing the map information may include the functions of i) converting map information from various map data providers to a unified data structure, ii) preparing the necessary map data structure suitable for matching a derived trajectory of the user, and/or iii) storing the map information in local storage, such as memory 46 (for embodiments in which anchor point ordering is performed remotely) or memory 20 (for embodiments in which anchor point ordering is performed locally).

On-line indoor/outdoor map service providers may provide web Application Programming Interfaces (APIs) to access their map database. Accordingly, the corresponding APIs from the map provider may be used to obtain map information for an area encompassing the user's trajectory. Particularly notable examples of venues that may have corresponding map information include indoor environments such as retail stores that may also provide point of sale information for determining anchor points. This map information may be processed to facilitate its use, such as by decoding to extract the necessary map data used for techniques of this disclosure using the APIs and converted into a unified format such as the Geographic Javascript Objective Notation (GeoJson) format, although xml files, binary files and others may be used. The converted map data can then be saved in the local storage for the future use. The decoding and conversion may be performed by external resources and delivered in any suitable manner for use during anchor point ordering. Generally, it is desirable to minimize the number of times processing operations are performed for each venue.

In some embodiments, obtained map information may be transformed into a geometric map. As such, processing the map information may include segregating it into traversable and non-traversable regions. For example, corridors represent an important class of traversable regions in typical indoor environments. As such, a corridor clipping function may be performed to extract corridor shape information from background entities if the corridor information is not available to present the map information as a polygon based geometric map. Many conventional map service providers do not offer corridor shape information which is important in an indoor map aided algorithm. Therefore, a suitable technique for obtaining the shape of corridors that may be present in the venue may include extracting all the other entities from the background entity. The background entity may be a boundary contour that establishes a given building or level of a building or other venue. Foreground entities within a venue may include all objects such as stock shelves, rooms, checkout stands, elevators, escalators, stock shelves, rooms, checkout stands, wall boundaries and other obstacles within the area encompassed by the map. The clipping process as used herein refers to the process of cutting away from a set of 2-dimensional geometric shapes those parts that are outside a particular 'clipping' window. This can be achieved by intersecting a subject polygon (background entity) with a clipping polygon (other foreground entities on top of the background entities). The polygons may be defined by a sequence of vertices and any curves may be represented as an appropriate set of line segments.

Figure 5:
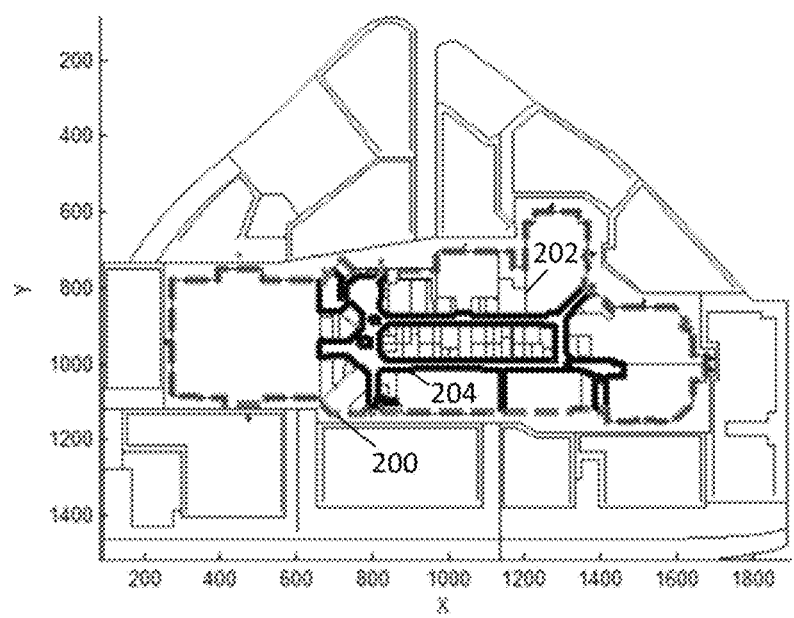
FIG. 5 is a schematic representation of map entity clipping in a geometric map according to an embodiment.

After iteratively clipping all the other entities from the background, the corridor polygon may be obtained. A suitable clipping algorithms may be configured to accommodate relatively complex polygons with holes, for example, the Vatti clipping algorithm. An illustration of the results of a clipping algorithm are shown in FIG. 5 for a representative polygon based geometric indoor map. The background entity 200 for a portion of the map is represented by a dashed line. Foreground entities are represented as polygons with fine lines, such as polygon 202 (the others are not labeled to preserve clarity), are clipped on top of background entity 200. The resulting polygon 204, represented by the heavy line, gives the shape of the corridor. The resulting corridor shape may be represented by a complex polygon. A complex polygon used herein is a polygon (without self-intersection) which has one or multiple holes inside.

As will be described below, some map entities may provide inherent position information, such as elevators, escalators, stairs that may be associated with level change scenarios or conveyors that may allow the assumption of heading or other position information. The locations of the entrances and exits to the background map entity, as well as doors or other entrances/exits to foreground entities may also be used. Still further, the direction of the entrances/exits may also be used when generating hypotheses. In a multi-level venue, the height of each level may be used with sensor information indicating changes in elevation to help determine when a level change scenario may exist.

In addition, processing may include decomposing one or more shapes of the map entities into small simpler polygons to improve the computation efficiency when ordering the anchor points. A trapezoid decomposition may be used to decompose relatively complex polygons into more simple trapezoids, while a convex decomposition may be used to partition relatively complex polygons into more simple convex polygons. An optimal decomposition algorithms may be applied to generate a reduced number of polygons after the decomposition process. Any one or combination of decomposition methods may be employed.

Figure 6:
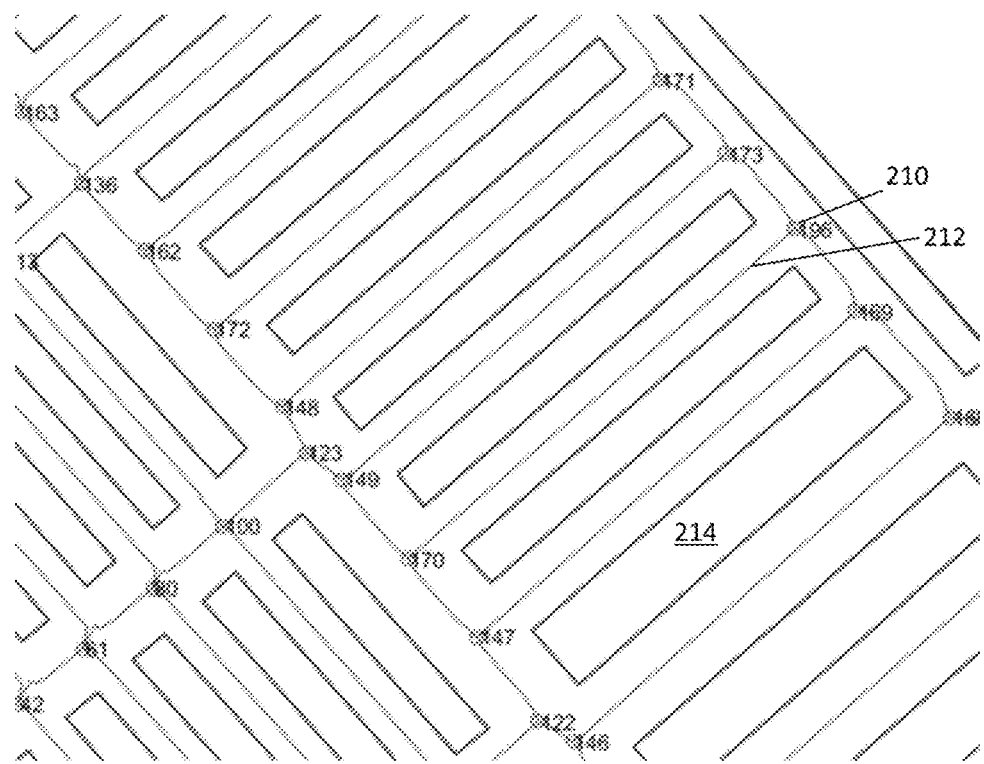
FIG. 6 is a schematic representation of grid map according to an embodiment.

Processing the map information may also include transforming the traversable areas of the indoor maps with connected traces and nodes in a grid map. Connected traces and nodes may contain both the geometric and the topological information of the map. Any suitable technique may be used to generate the grid map, such as for example by using a voronoi diagram, to represent candidate paths through the venue. An example voronoi diagram is shown in FIG. 6, and includes the characteristic elements of nodes, represented by circles, such as node #196 indicated as element 210 and traces, represented by the connecting lines, such as element 212. A node is any point on the map equidistant to three or more closest objects, the map entities indicated by solid polygons, such as element 214. In this example, the map entities shown are rectangular shelves. To illustrate these concepts, it may be seen that node #196 has three equidistant closest objects, namely the two surrounding shelves and the wall. Similarly, node #100 has four equidistant objects, the four surrounding shelves. Correspondingly, a trace is a set of points (i.e., a line) which is equidistant to only two closest objects. The straight line connecting node #196 and node #170 is an example of a trace, as each point of the line has only two closest objects. Thus, the grid map shown in FIG. 6 is characteristic of a retail venue with regularly spaced rectangular shelves, with the nodes and tracks representing candidate paths that a user could take around the map entities.

Figure 7:
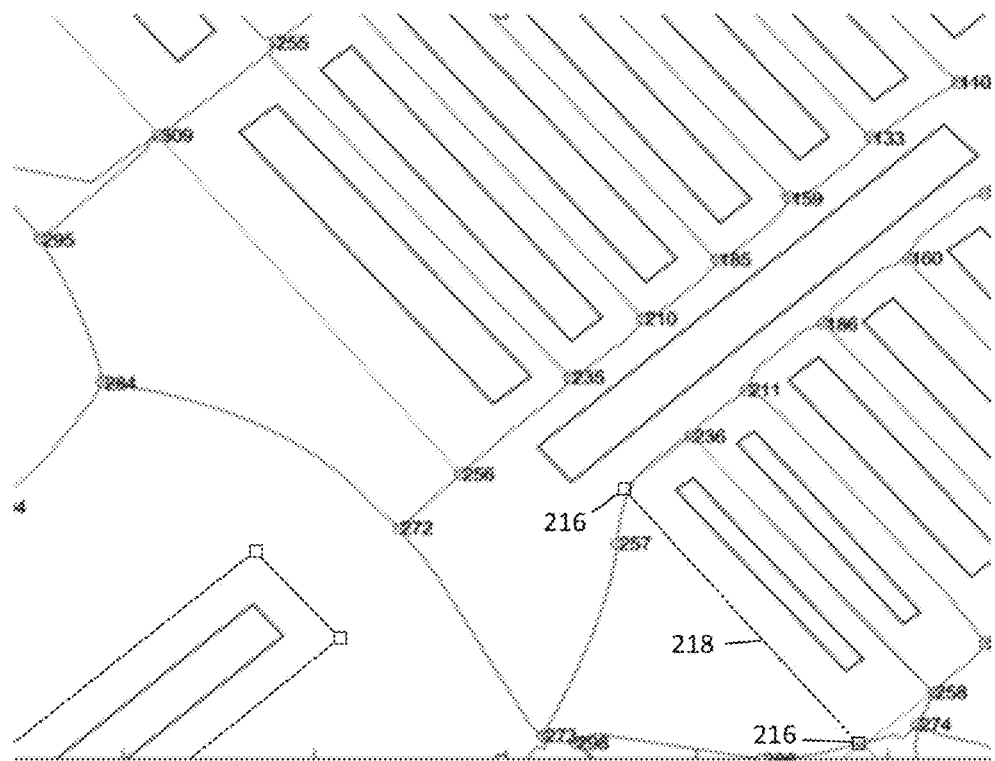
FIG. 7 is a schematic representation of grid map having supplemental nodes and traces according to an embodiment.

Depending on the configuration of the retail venue, the nodes and traces developed from the voronoi diagram may not account for all possible routes, such as routes around objects which are located at the perimeter of open spaces in the retail venue. Additional operations as shown in FIG. 7 may be performed to complete the possible routes by adding supplemental nodes, indicated by squares such as 216 and traces, indicated by dashed tracks such as 218. The supplemental nodes and traces complete candidate paths around map entities.

Figure 8:
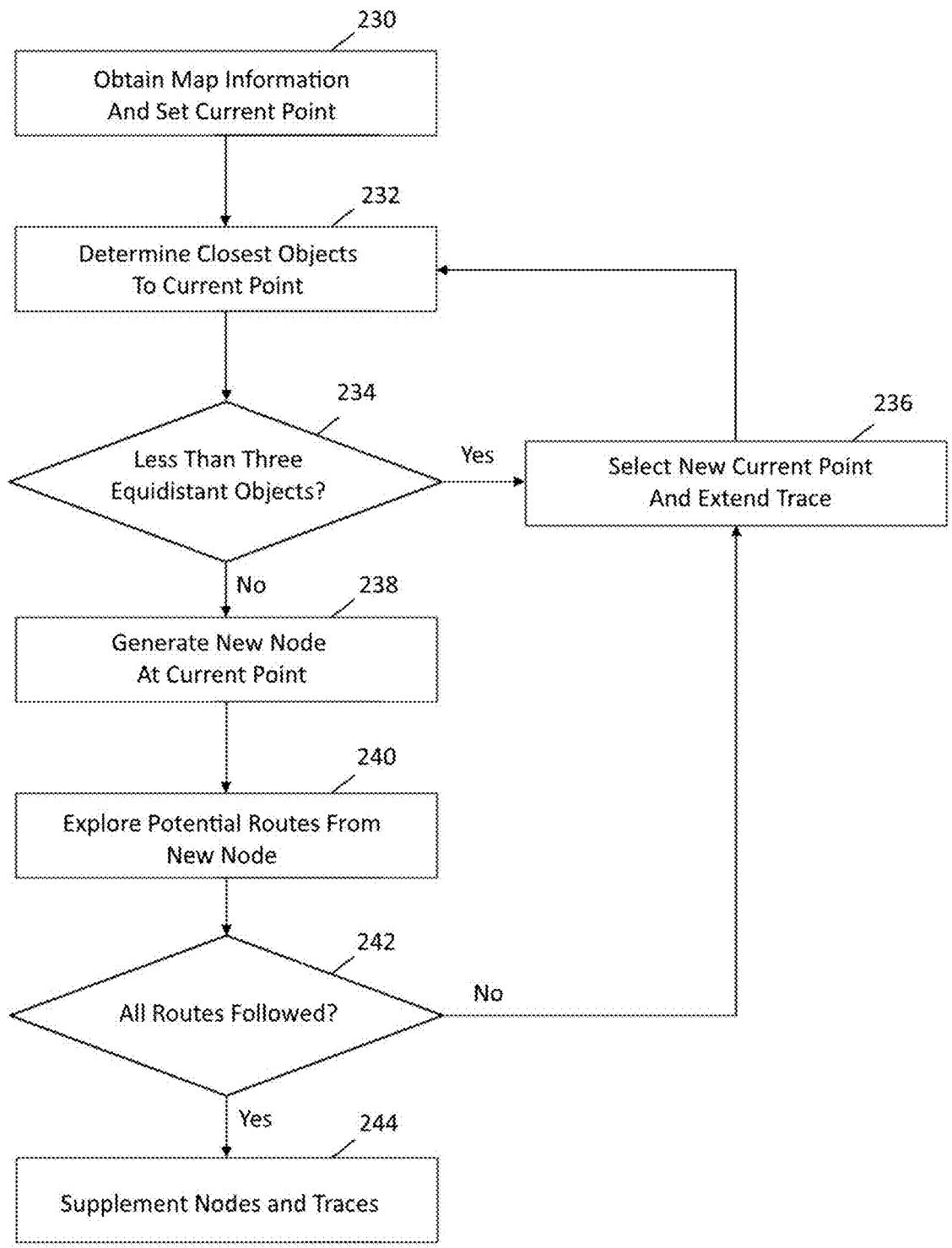
FIG. 8 is a schematic representation of routine for generating a grid map according to an embodiment.

One suitable routine for generating a grid map for use in ordering anchor points is represented by the flowchart shown in FIG. 8. Beginning with 230, map information for a venue, such as a retail store, may be obtained, with map entities represented by polygons as discussed above. An initial starting position may be selected to as the current point for generation of the voronoi diagram. In 232, the closest objects to the current point are determined. The routine branches in 234, depending on the number of closest objects. If less than three closest objects are equidistant, a new current point is selected and a trace is created or continued to the new current point in 236. The routine then returns to 232 to determine the closest objects with respect to the new current point. If three or more closest objects are equidistant in 234, the current point is designated a node in 238. Next, possible routes starting from the new node are explored in 240. A determination is made in 242 if a new route may be started. If so, the routine returns to 236 and a trace is formed to a new current point along the new route. If it is determined in 242 that all possible routes have been explored, the routine continues to 244 to determine whether any supplemental nodes and/or traces are required to complete routes around any of the map entities as described above. The complete set of nodes and traces than may be used to define candidate paths that the user could have traversed through the venue.

In one aspect, a grid map may enhance the geometric aspects of map information as well as providing topological aspects. The topological information from the indoor map may be also applied to improve the reliability and the accuracy of the anchor point ordering. For example, a retail venue map may be readily divided into structured areas and non-structured areas. Non-structured areas, such as open space, isolated booths and the like, may benefit from geometric based techniques as described above. However, structured areas, such as aligned shelves, booths and similar features may be abstracted as connected traces and nodes to be used in a grid based map.

Figure 9:
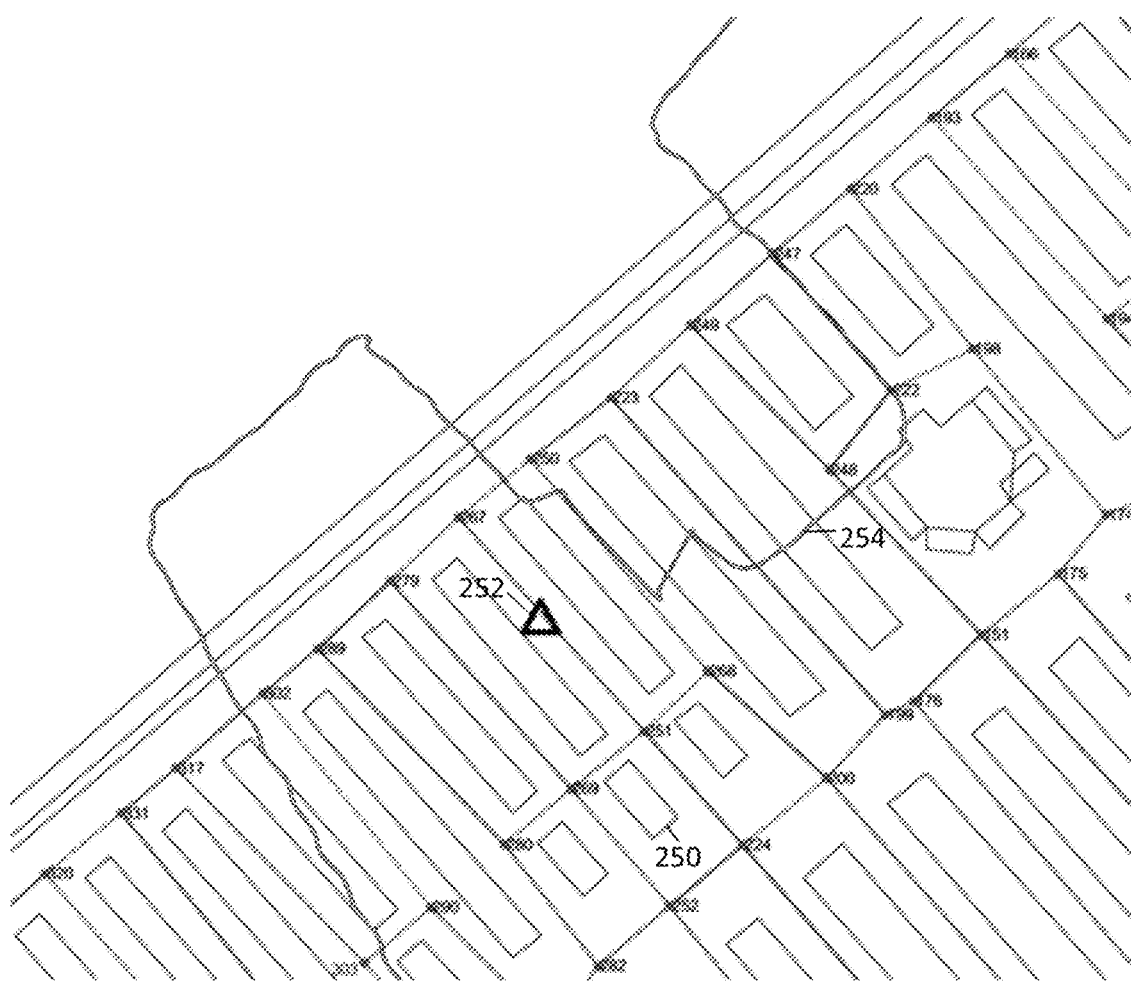
FIG. 9 is a schematic representation of portion of a user trajectory for shape matching with map information according to an embodiment.

As described above, shape matching a trajectory derived from motion sensor data may be used to identify candidate paths from the possible routes indicated by the map information, such as interconnected nodes and traces of a grid map. Further, anchor points may help select a solution path that represents the actual user trajectory from the candidate paths, so that the anchor points may be properly ordered. Particularly in the context of a retail venue, point of sale information may be used to identify suitable anchor points in the form of the known locations of items purchased by the user. Such an anchor point may be associated with the map information by locating the respective coordinates of the anchor point on the map. For example, FIG. 9 illustrates a portion of a grid map for a retail venue, with nodes represented by circles, traces represented by connecting dotted lines and objects represented by polygons, such as map entity 250. An anchor point 252 corresponding to the known location of an item purchased by the user, as determined from point of sale information, is indicated by a triangle. As shown, anchor point 252 is located on the edge that is formed by the two nodes of #267 and #251 on the indoor grid map.

A portion of the user trajectory derived from motion sensor data, such as by navigation module 36 of portable device 16, is represented in FIG. 9 as outline track 254. Although the user trajectory has clearly drifted, its shape may still be matched to the possible routes established by the grid map. To illustrate, the start of the trajectory may be known to commence around node #303, so that the initial heading is in the direction from node #303 to node #317. As shown, track 254 undergoes two heading changes corresponding to right hand turns following the start of the trajectory. The direction of these turns and the distance between them establishes a characteristic shape that may be matched. Given a start at node #303, the grid map indicates that one possible route matching the shape of track 254 may be defined by the sequence of nodes #303, #317, #302, #279, #267, and #251 and the connecting traces. However, other possible routes may also exist, such as the route defined by the sequence of nodes #303, #317, #302, #279, #267, #250, and #268 and their connecting traces. From these two candidate paths, a solution path may be identified that incorporates the location of anchor point 252. Specifically, since anchor point 252 is located between nodes #267 and #251, the candidate corresponding to the first possible route may be selected as the solution path over the second possible route. A similar process may be repeated throughout the trajectory and for any available anchor points.

To facilitate matching the shape of a user trajectory as derived from motion sensor data to the possible routes through the retail venue, such as those established by the interconnected nodes and traces of a grid map, the trajectory may be analyzed to characterize turns, which may then be shape matched to the possible routes. Thus, even if the trajectory derived from motion sensor data drifts from the actual trajectory, the shape may still be used to identify candidate paths in light of the possible routes indicated by the map. The trajectory may be decomposed to identify turns that occurred. Further, links between two consecutive turns may further characterize the shape of the trajectory.

Figure 10:
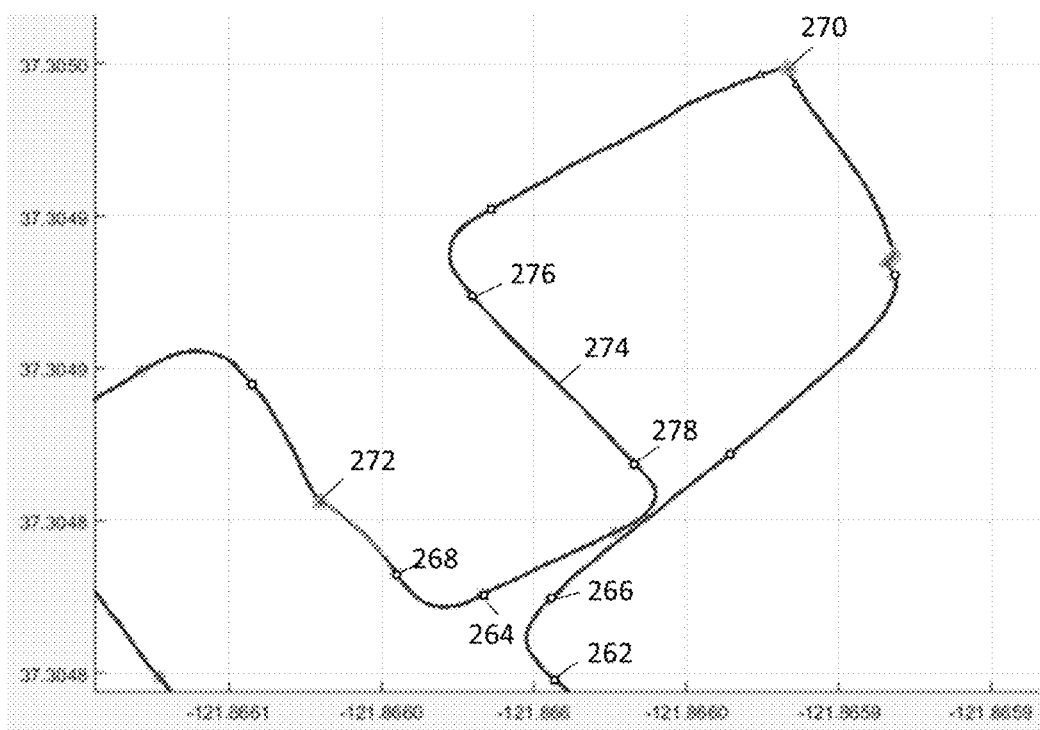
FIG. 10 is a schematic representation of decomposing a portion of a user trajectory into turns and links according to an embodiment.

For example, any suitable turn identification algorithm may be employed to characterize turns based at least in part on the underlying device heading of portable device 16, or the platform heading of the user, by examining the accumulative change rate of the heading information. In one embodiment, when a threshold rate of change is exceeded, a turn start may be identified. Correspondingly, when the rate of change falls back below the threshold, a turn end may be identified, such that the turn is defined as the portion of the trajectory between the turn start and the turn end. In the context of the example shown in FIG. 10, a portion of a trajectory derived from motion sensor data is represented by black track 260. Turn starts may be identified by squares, such as turn starts 262 and 264. Turn ends may be identified by circles, such as turn ends 266 and 268. If desired, heading information from the motion sensor data may be filtered to provide better determination of the starting and ending of turns. For example, high frequency heading noise may be present and may be reduced by employing a low pass filter.

Turns may also be identified in the context of periods of non-meaningful motion, such as fidgeting. A user may stop during the trajectory and may or may not interact with the portable device. During such periods, motion detected by the portable device may be characterized as a non-meaningful fidgeting period. Step length information may also be used when characterizing non-meaningful fidgeting periods. However, when the fidgeting period stops, the trajectory may have a new heading that constitutes a turn. When the heading change following a fidgeting period exceeds a threshold, a turn may be identified as shown by pair of triangles for fidgeting period 270. In contrast, the heading change following fidgeting period 272 did not exceed the threshold, so no turn has been identified.

In further embodiments, the trajectory shape may be analyzed directly using the concept of cumulative turning angle function known in the shape matching literature.

The trajectory may be further characterized by identifying links between consecutive turns. For example, link 274 may be identified as the portion of the trajectory extending between turn end 276 and turn start 278.

Another example of a suitable technique for identifying turns may involve characterizing an intersection between adjacent trajectory segments. Each trajectory segment may represent periods of straight line motion. The position of the portable device at multiple epochs along the trajectory may be determined, such as by using forward and/or backward processing as described herein. Positions that fall within a suitable threshold of a line may be grouped into segments corresponding to straight line motion of the portable device. When adjacent segments form an angle exceeding a threshold, a turn may identified having a center at the intersection between the adjacent segments. As an illustration only and without limitation, examples of suitable thresholds be in the range of 25° to 45°.

Figure 11:
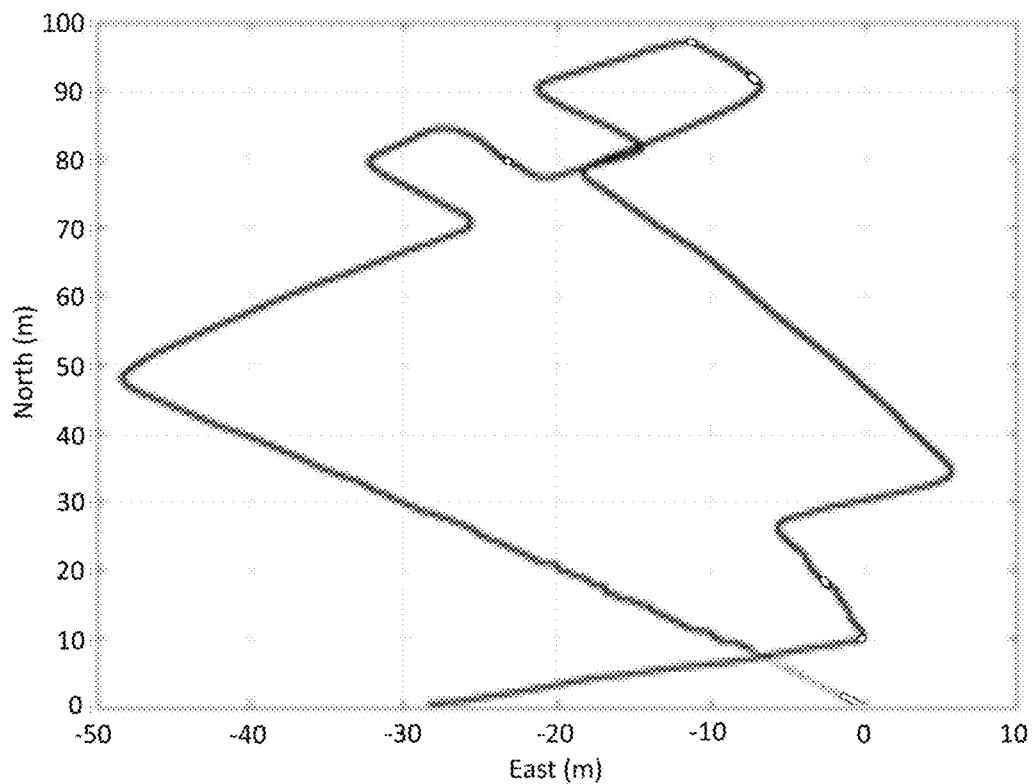
FIG. 11 is a schematic representation of a sample trajectory according to an embodiment.
Figure 12:
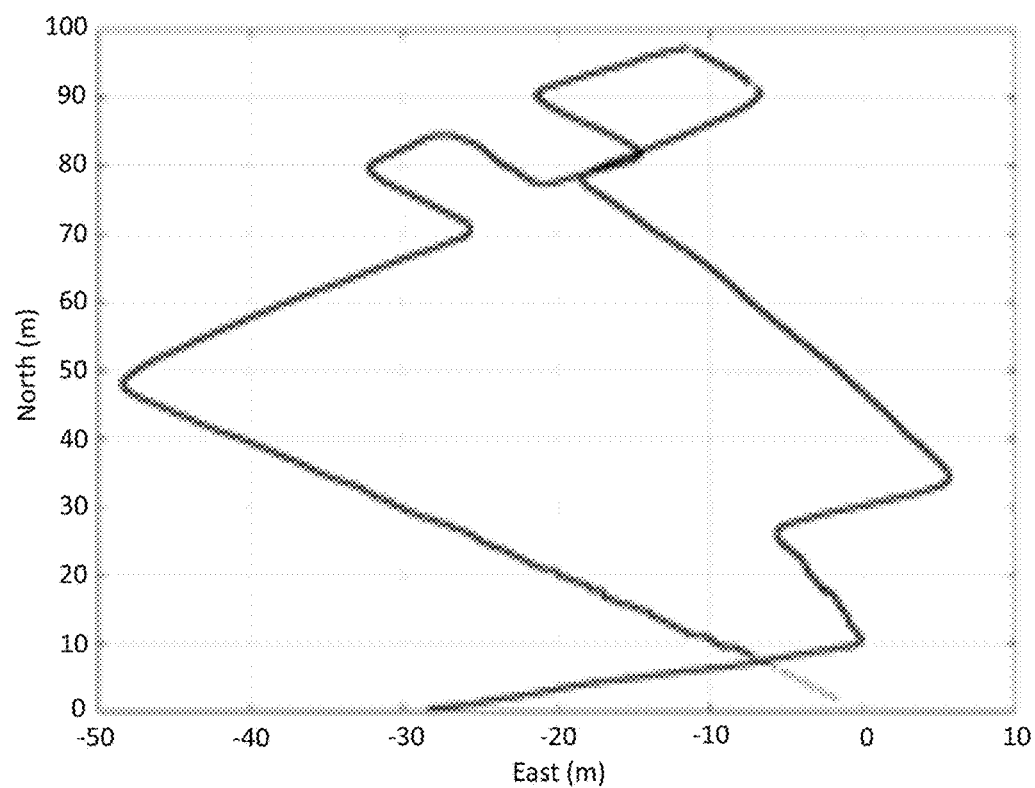
FIG. 12 is a schematic representation of the sample trajectory of FIG. 11 following removal of fidgeting and zero step length periods according to an embodiment.
Figure 13:
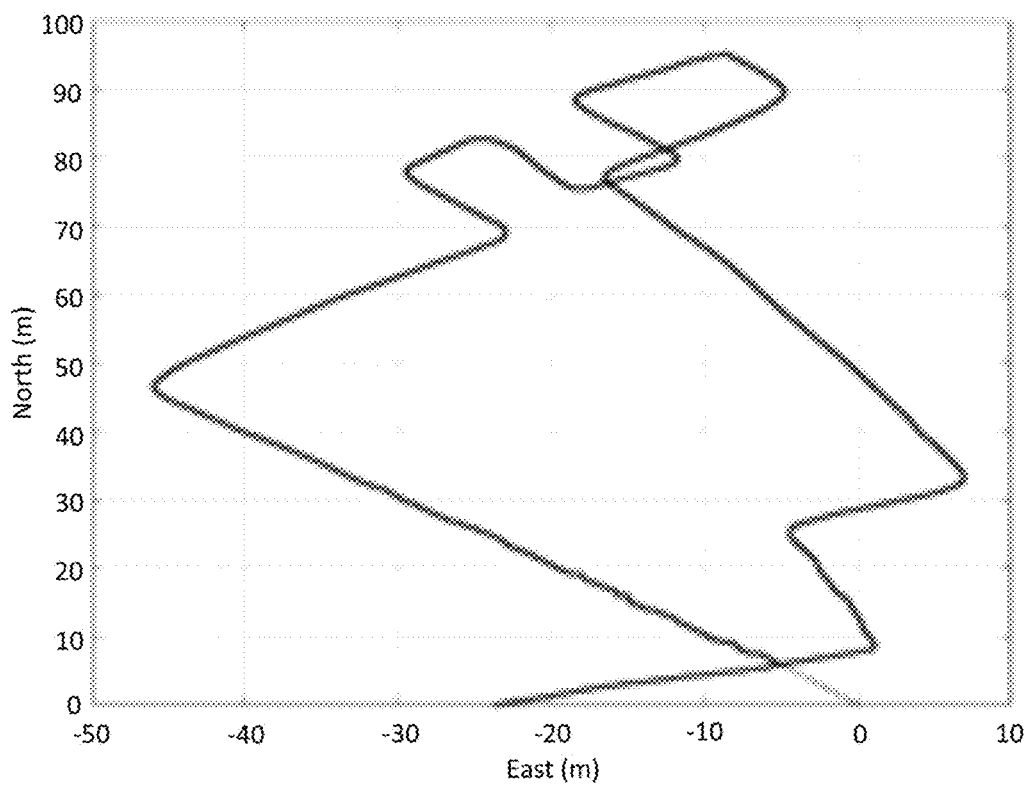
FIG. 13 is a schematic representation of the reconnected sample trajectory of FIG. 11 according to an embodiment.
Figure 14:
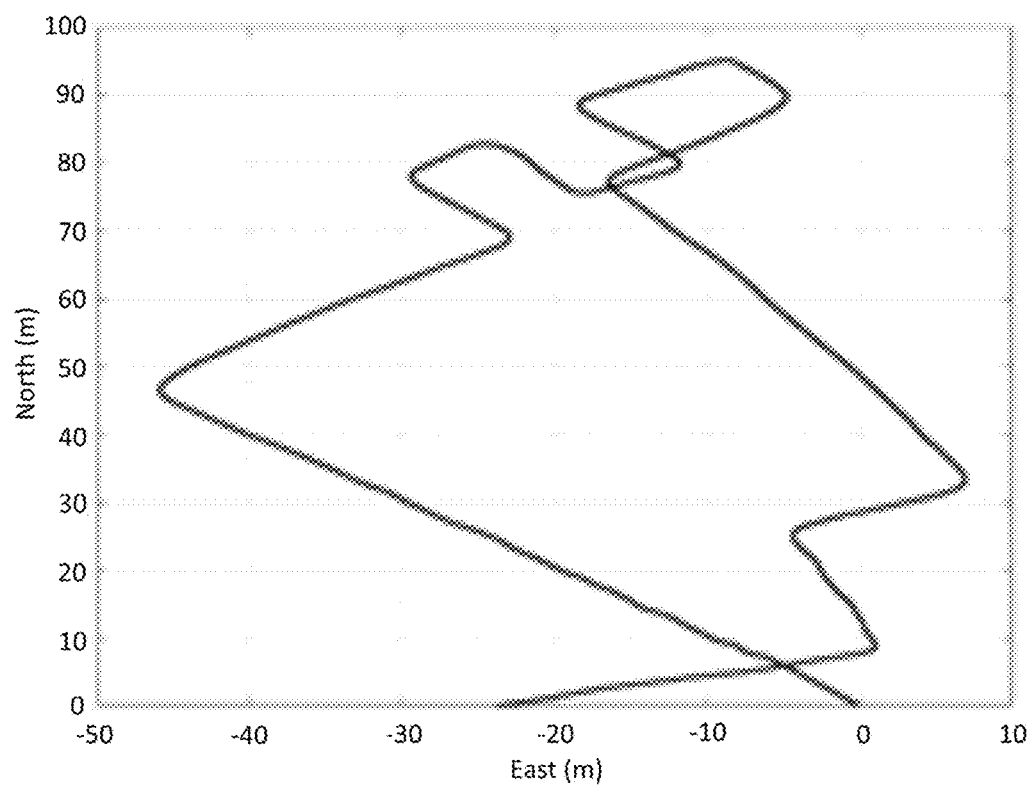
FIG. 14 is a schematic representation of the smoothed sample trajectory of FIG. 11 according to an embodiment.
Figure 15:
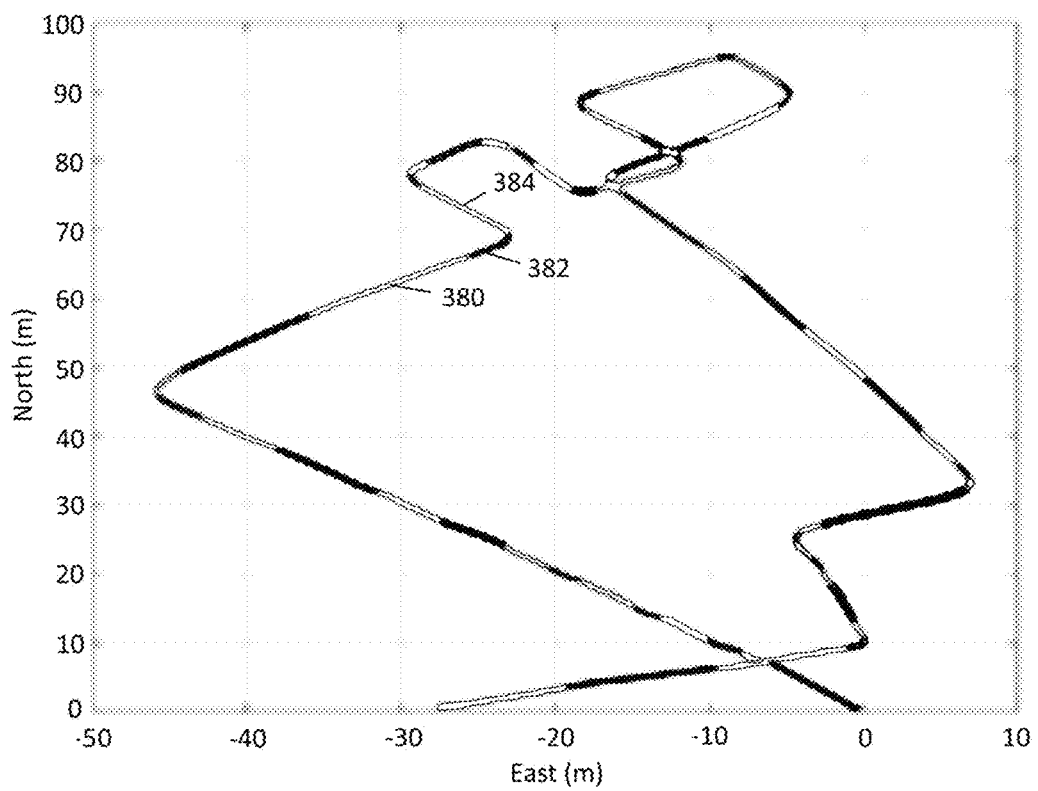
FIG. 15 is a schematic representation of the sample trajectory of FIG. 11 divided into adjacent segments according to an embodiment.
Figure 16:
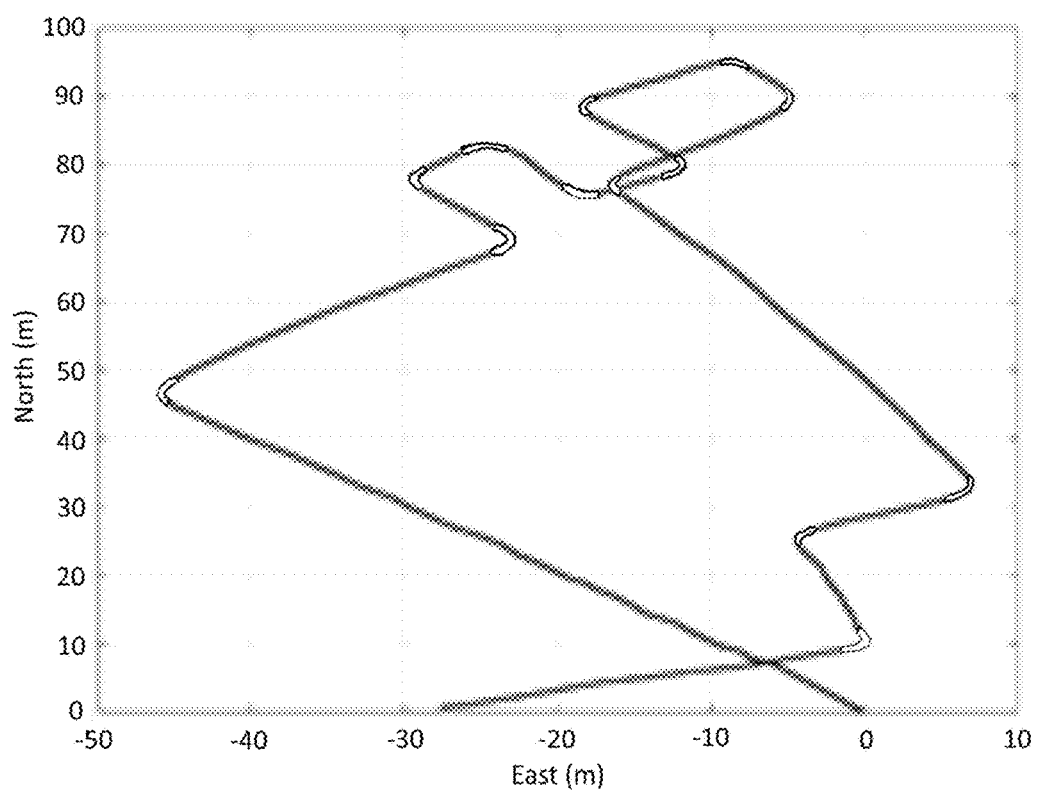
FIG. 16 is a schematic representation of the sample trajectory of FIG. 11 following turn identification between adjacent segments according to an embodiment.
Figure 17:
FIG. 17 is a schematic representation of shape matching turns and links of a user trajectory on a grid map according to an embodiment.
Figure 18:
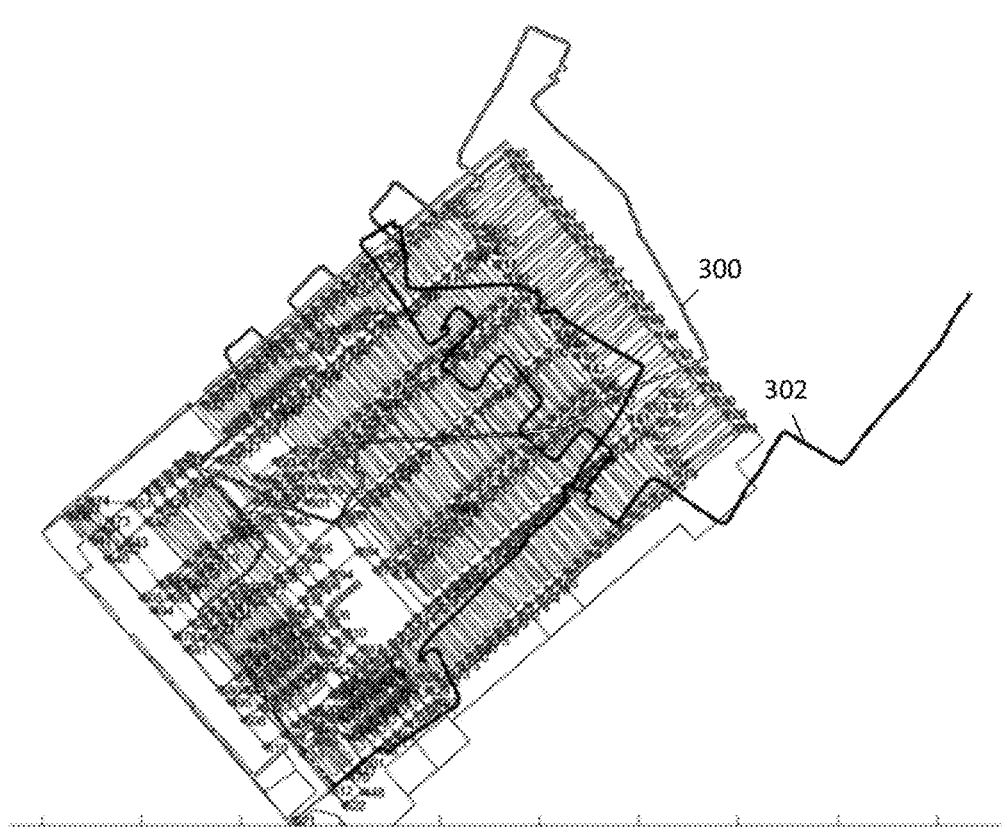
FIG. 18 is a schematic representation showing trajectories derived by forward and backward processing according to an embodiment.

To help illustrate the use of trajectory segments for turn identification, FIG. 11 depicts a sample trajectory. To facilitate turn identification, an initial series of processing steps optionally may be performed on the trajectory. First, fidgeting periods and/or periods characterized as having zero step length may be identified, designated by the outlined portions of the trajectory in FIG. 11. These periods may then be removed from the trajectory as shown in FIG. 12. The remaining portions of the trajectory may then be connected as indicated in FIG. 13. Further, one or more smoothing passes may be performed to generate a smoothed trajectory as shown in FIG. 14. Following these initial operations, the trajectory may be divided into a plurality of adjacent straight line segments. FIG. 15 shows the trajectory after being divided into the straight line segments, with alternating segments designated by outlined and solid lines. The angles formed by adjacent segment pairs may be compared to a threshold. When the angle exceeds the threshold, a turn may be identified, with the center of the turn located at the intersection between the segments. For example, the angle formed by segments 280 and 282 does not exceed the threshold, so both segments may be characterized as continuous straight line motion without a turn. In comparison, the angle formed by segments 282 and 284 does exceed the threshold and correspondingly, a turn may be identified at their intersection. After grouping all segments that do not exceed the threshold together, an output trajectory may be generated as shown in FIG. 16, with each turn designated by an outlined portion of the trajectory.

Any one or combination of the turn identification techniques described above, or others, may be employed as desired. In some embodiments, different techniques may be performed in parallel and used to verify or reject one or more of the identified turns.

Following decomposition of the trajectory derived from motion sensor data, any of the identified turns and links may be used to shape match the trajectory with the possible routes established by the map information to generate candidate paths. Another exemplary grid map for a retail venue is shown in FIG. 11, with nodes represented by open circles, traces represented by connecting dotted lines and objects represented by polygons. The trajectory derived from motion sensor data is represented by outline track 290. Two consecutive turns, with respective starts and ends, are indicated on track 290 by the closed circles and a first link exists between the start of the trajectory and the first turn and a second link exists between the two turns. The initial link may be used as a basis for shape matching to the grid map. Link parameters include the length of the link, which represents the distance that the user over the portion of the trajectory corresponding to the link, and the heading of the link. The heading may be determined by the relationship of the start of the link to the end of the link. As shown in FIG. 11, the initial link starts at node #512 and has minimal heading drift. To match the initial link to the grid map, the distance starting from node #512 along the heading of the link may be seen to extend to either node #558 or node #582. The distance on the grid map from node #512 to #558 or #582 may then be compared with the length of the link through a ratio test. Depending on the results, either or both nodes #558 and #582 may be identified as nodes on candidate paths. All the possible candidates for the initial link may be maintained.

Next, the turn following the initial link may be matched to the map to continue the process. Each turn may have a turning angle parameter that may be determined by the heading differences between the precedent link segment and the subsequent link segment. The magnitude and direction of the turning angle may be used to determine whether the current turn is a right or a left turn. For the candidate path incorporating node #558 as end of the initial link, a right hand turn may be seen to lead to node #493. If there is a grid edge between node #558 and #476, then node #476 may also be determined as a possible candidate node that forms a right turn with node #558, depending on the angle discrimination test threshold when comparing the turning angle magnitude of the trajectory turn with the approximately 90 degrees right turn of the grid map.

Accordingly, all candidate nodes and traces that are identified by shape matching to the decomposed trajectory may be maintained as candidate paths. As described above in the context of FIG. 9, any anchor points that have been identified, such as from point of sale information, may then be used to select a solution path. For example, a candidate path that does not pass by a known anchor point may be excluded. In some embodiments, the solution path may be selected as the candidate that best fits the anchor points. Once a solution path has been selected, the anchor points may be ordered based on their sequence in relation to the solution path. Further, the user position from the derived trajectory may be correlated to the known position of each anchor point so that timing information may also be determined for when the user was at the anchor points. As will be appreciated, determining timing information for an anchor point allows it to be used directly as an update for a sensor-based navigation solution. In some embodiments, the ordering of the anchor points and/or the timing information may be associated with an uncertainty measure.

The operations of navigation module 36 in deriving a user trajectory based on motion sensor data has primarily been described in the context of forward processing the sensor data. However, in some embodiments, performance may be improved by also implementing backward processing of the sensor data. For example, FIG. 12 shows an example of a trajectory derived by forward processing as outline track 300 and a trajectory derived by backward processing as black track 302. Ordering of the anchor points may benefit from the additional backward solution. Notably, the same turn identification procedure may be applied to the backward processing so that the identified turns may verify the turns identified from forward processing or complement the forward solution if a turn was not detected. Further, the same ordering process may be applied to the backward solution, so that the backward ordering results may be combined with the forward ordering results to help resolve any uncertainties in the anchor point ordering.

Additionally, one or more smoothing passes may be performed in conjunction with forward and/or backward processing the motion sensor data. Input data may also be included from other sources when available, such as absolute navigation information, models of user dynamics (e.g., step length estimation), characteristics of sensor performance (e.g.), supplemental sensor data and others. The navigation solution used to derive the user trajectory may include any suitable information related to the position, motion and/or orientation of portable device 16. For example, a navigation solution may include position, velocity and attitude, position and attitude, position and velocity, position and speed, attitude alone or other combinations of these quantities. The navigation solution may also include other related quantities, such as the quantities used for the errors in input data. The term navigation used in this application is not limited to online or real-time navigation solutions, it may also include offline or post-processing solutions among others.

Generally, forward and backward processing of the input data may be performed to derive interim navigation solutions. One or more quantities of the interim navigation solutions may be combined to smooth the quantities. Further passes of forward and backward processing may performed as desired using quantities of the navigation solution that were combined to further enhance the navigation solutions. Backward processing may also be helpful for a long trajectory when positioning information toward the end of the trajectory is available, such as from an anchor point like a checkout point or store exit. A backward processed navigation solution may significantly reduce the accumulated error that may otherwise occur. Furthermore, more reliable misalignment estimates may be obtained. Further details regarding forward and backward processing and smoothing operations that may be performed are described in co-pending, commonly-assigned U.S. patent application Ser. No. 15/054, 792, filed Feb. 26, 2016, which is entitled "Method and Systems for Multiple Pass Smoothing," and is incorporated by reference in its entirety.

It will also be appreciated that the motion sensor data may indicate one or more periods when the position of the portable device 16 is relatively stationary, such as the fidgeting periods described above. In addition to such periods when portable device 16 is undergoing non-meaningful motion, stationary periods may also be characterized by portable device 16 being substantially static or motionless. Such fidgeting and stationary periods may indicate an interval when the user has paused during the trajectory and may be termed a "dwell." A correlation may exist between a dwell and a point of sale anchor point. Generally, a user may stop when selecting an item for purchase. Correspondingly, a dwell period may be used to help order and/or time tag an anchor point. However, it will be recognized that a complete correlation may not exist. A user may not dwell when selecting an item for purchase if the user simply takes the item while passing by. Similarly, a user may stop or pause without selecting an item for purchase. Nevertheless, dwells may facilitate the ordering process, as they may be used to constrain the route derived by motion sensor data. Further, for scenarios such as revisiting anchor points and/or ambiguous moving directions in a corridor between shelves, dwells may be used to help distinguish the order of anchor points.

Depending on the architecture of device 100, sensor processor 108 and inertial sensor 112 may be formed on different chips, or as shown, may reside on the same chip. A sensor fusion algorithm employed to calculate the orientation of device 100 may be performed externally to sensor processor 108 and MPU 106, such as by host processor 104, or may be performed by MPU 106. A chip may be defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits.

One or more sensors may be incorporated into the package if desired using any suitable technique. In some embodiments, a sensor may be MEMS-based, such that a MEMS cap provides mechanical support for the MEMS structure. The MEMS structural layer is attached to the MEMS cap. The MEMS cap is also referred to as handle substrate or handle wafer. In some embodiments, the first substrate may be vertically stacked, attached and electrically connected to the second substrate in a single semiconductor chip, while in other embodiments, the first substrate may be disposed laterally and electrically connected to the second substrate in a single semiconductor package. In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

The techniques of this disclosure may be combined with any navigation solution independent of the type of the state estimation or filtering technique used in this navigation solution. The state estimation technique can be linear, non-linear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems. The state estimation technique used in the navigation solution can use any type of system and/or measurement models. The navigation solution may follow any scheme for integrating the different sensors and systems, such as for example loosely coupled integration scheme or tightly coupled integration scheme among others. The navigation solution may utilize modeling (whether with linear or nonlinear, short memory length or long memory length) and/or automatic calibration for the errors of inertial sensors and/or the other sensors used.

Contemplated Embodiments

The present disclosure describes the body frame to be x forward, y positive towards right side of the body and z axis positive downwards. It is contemplated that any body-frame definition can be used for the application of the method and apparatus described herein.

It is contemplated that the techniques of this disclosure can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that techniques of this disclosure can also be used with a mode of conveyance technique or a motion mode detection technique to establish the mode of conveyance. This enables the detection of pedestrian mode among other modes such as for example driving mode. When pedestrian mode is detected, the method presented in this disclosure can be made operational to determine the misalignment between the device and the pedestrian.

It is further contemplated that techniques of this disclosure can also be used with a navigation solution that is further programmed to run, in the background, a routine to simulate artificial outages in the absolute navigation information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigation information (e.g. GNSS); the forward integrated navigation solution in the device integrating the available sensors with the absolute navigation information (e.g. GNSS) and possibly with the optional speed or velocity readings; or a backward smoothed integrated navigation solution integrating the available sensors with the absolute navigation information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the techniques of this disclosure can also be used with a navigation solution that is further integrated with maps (such as street maps, indoor maps or models, or any other environment map or model in cases of applications that have such maps or models available), and a map aided or model aided routine. Map aided or model aided can further enhance the navigation solution during the absolute navigation information (such as GNSS) degradation or interruption. In the case of model aided, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the techniques of this disclosure can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements; such enhancement is the carrier-smoothed pseudorange.

It is further contemplated that the techniques of this disclosure can also be used with a navigation solution that relies on an ultra-tight integration scheme between GNSS receiver and the other sensors' readings.

It is further contemplated that the techniques of this disclosure can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or WiMax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but is not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the techniques of this disclosure can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device (s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processor enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for ordering a plurality of anchor points based at least in part on a navigation solution from a portable device, wherein the mobility of the portable device is constrained or unconstrained within a platform and wherein the portable device may be tilted to any orientation, the method comprising:
   a) obtaining motion sensor data for the portable device representing motion of the portable device at a plurality of epochs over a first period of time, wherein the motion sensor data comprises data from at least one inertial sensor;
   b) deriving a trajectory for the portable device for the first period of time based at least in part on the obtained motion sensor data;
   c) obtaining a map of a venue encompassing the trajectory;
   d) obtaining at a time subsequent to the first period of time a plurality of temporally unordered anchor points associated with the trajectory, wherein the unordered anchor points are derived from point of sale information;
   e) associating known positions of the plurality of anchor points with the map;
   f) characterizing turns of the trajectory;
   g) generating a plurality of candidate paths by comparing the characterized turns to the map;
   h) selecting a solution path from the plurality of candidate paths that corresponds to the plurality of anchor points; and
   i) ordering the plurality of anchor points temporally based at least in part on the solution path, so that the plurality of anchor points are temporally ordered based at least in part on the obtained motion sensor data.

2. The method of claim 1, wherein characterizing turns of the trajectory comprises identifying pairs of sequential turns and a distance traveled between each pair of sequential turns.

3. The method of claim 2, wherein each turn comprises a start and an end and the distance traveled between a pair of sequential turns comprises a distance between the end of a first turn and the start of a subsequent turn.

4. The method of claim 3, wherein the distance traveled between a pair of sequential turns is determined based at least in part on step length.

5. The method of claim 2, wherein characterizing turns of the trajectory further comprises determining a link for each pair of sequential turns, wherein the link comprises a portion of the trajectory having the distance traveled between the pair of sequential turns and a heading.

6. The method of claim 2, further comprising identifying a turn based at least in part on a rate of heading change of the portable device exceeding a threshold.

7. The method of claim of claim 6, further comprising filtering heading information before identifying a turn.

8. The method of claim 6, wherein the start of the turn is determined when the rate of heading change exceeds the threshold and the end of the turn is determined when the rate of heading change falls below the threshold.

9. The method of claim 2, further comprising identifying a turn based at least in part on a detected fidgeting period and a change of heading during the fidgeting period.

10. The method of claim 9, wherein the start of the turn is determined when the fidgeting period begins and the end of the turn is determined when the fidgeting period ends.

11. The method of claim 2, further comprising identifying a turn based at least in part on determining an angle formed by adjacent segments of the trajectory exceeds a threshold.

12. The method of claim 5, wherein generating a candidate path comprises shape matching identified pairs of sequential turns and their associated link with the map.

13. The method of claim 12, wherein shape matching is based at least in part on the distance and heading of each link.

14. The method of claim 12, wherein shape matching is based at least in part on a turning angle determined with respect to two sequential links.

15. The method of claim 1, further comprising associating an uncertainty measure with each of the ordered plurality of anchor points.

16. The method of claim 1, further comprising associating at least one anchor point of the plurality of anchor points with a position of the trajectory.

17. The method of claim 16, further comprising determining a time for the at least one anchor point based at least in part on the associated position.

18. The method of claim 17, further comprising associating an uncertainty measure with the determined time for the at least one anchor point.

19. The method of claim 1, further comprising detecting a dwell period based at least in part on the sensor data and correlating one of the anchor points with the dwell period.

20. The method of claim 19, wherein the dwell period corresponds to a static motion characteristic.

21. The method of claim 19, wherein the dwell period corresponds to a fidgeting motion characteristic.

22. The method of claim 1, wherein deriving the trajectory comprises performing a forward processing operation over the first period of time.

23. The method of claim 1, wherein deriving the trajectory comprises performing a backward processing operation over the first period of time.

24. The method of claim 1, wherein deriving the trajectory comprises performing a forward processing operation and a backward processing operation over the first period of time.

25. The method of claim 1, wherein deriving the trajectory comprises performing a forward processing operation, a backward processing operation over the first period of time, and a combination of the forward processing and backward processing.

26. The method of claim 1, wherein deriving the trajectory comprises performing a smoothing operation over the first period of time.

27. The method of claim 1, wherein deriving the trajectory comprises performing a backward smoothing operation over the first period of time.

28. The method of claim 1, wherein deriving the trajectory comprises performing a multiple pass processing operation over the first period of time.

29. The method of claim 1, further comprising transforming the obtained map into a grid of connected traces and nodes.

30. The method of claim 29, wherein transforming the obtained map comprises constructing a voronoi diagram.

31. The method of claim 29, wherein each node is equidistant from at least three map entities and wherein each trace is equidistant from less than three map entities.

32. The method of claim 1, further comprising transforming the obtained map into a polygon based geometric map.

33. A system for ordering a plurality of anchor points comprising:
   a) a portable device comprising an integrated sensor assembly, configured to output motion sensor data for the portable device representing motion of the portable device at a plurality of epochs over a first period of time, wherein the motion sensor data comprises data from at least one inertial sensor, wherein the mobility of the portable device is constrained or unconstrained within a platform and wherein the portable device may be tilted to any orientation, and a communications module for transmitting information corresponding to the epochs; and
   b) remote processing resources configured to receive the information from the portable device and having a processor configured to implement an ordering module to:
   i) obtain a map of a venue encompassing a trajectory derived for the portable device for the first period of time;
   ii) obtain at a time subsequent to the first period of time a plurality of temporally unordered anchor points associated with the trajectory, wherein the unordered anchor points are derived from point of sale information;
   iii) associate known positions of the plurality of anchor points with the map;
   iv) characterize turns of the trajectory;
   v) generate a plurality of candidate paths by comparing the characterized turns to the map;
   vi) select a solution path from the plurality of candidate paths that corresponds to the plurality of anchor points; and
   vii) order the plurality of anchor points temporally based at least in part on the solution path, so that the plurality of anchor points are temporally ordered based at least in part on the motion sensor data.

34. The system of claim 33, wherein the information received by the remote processing resources comprises sensor data for the portable device and wherein the ordering module is further configured to derive the trajectory based at least in part on the sensor data.

35. The system of claim 33, wherein the portable device further comprises a navigation module configured to derive the trajectory based at least in part on the sensor data at the plurality of epochs and wherein the communications module transmits the trajectory.

36. A server for ordering a plurality of anchor points comprising processing resources configured to implement an ordering module to:
   a) obtain a map of a venue encompassing a trajectory derived for a portable device from motion sensor data representing motion of the portable device at a plurality of epochs over a first period of time, wherein the motion sensor data comprises data from at least one inertial sensor, wherein the mobility of the portable device is constrained or unconstrained within a platform and wherein the portable device may be tilted to any orientation;

b) obtain at a time subsequent to the first period of time a plurality of temporally unordered anchor points associated with the trajectory, wherein the unordered anchor points are derived from point of sale information;

c) associate known positions of the plurality of anchor points with the map;

d) characterize turns of the trajectory;

e) generate a plurality of candidate paths by comparing the characterized turns to the map;

f) select a solution path from the plurality of candidate paths that corresponds to the plurality of anchor points; and g) order the plurality of anchor points temporally based at least in part on the solution path, so that the plurality of anchor points are temporally ordered based at least in part on the motion sensor data.

37. The server of claim 36, wherein the server receives sensor data for the portable device for the plurality of epochs and wherein the ordering module is further configured to derive the trajectory based at least in part on the sensor data.

38. The server of claim 36, wherein the server receives the trajectory based at least in part on the sensor data at the plurality of epochs from the portable device.

39. A portable device for ordering a plurality of anchor points comprising:

a) an integrated sensor assembly, configured to output motion sensor data for the portable device representing motion of the portable device at a plurality of epochs over a first period of time, wherein the motion sensor data comprises data from at least one inertial sensor, wherein the mobility of the portable device is constrained or unconstrained within a platform and wherein the portable device may be tilted to any orientation, and a communications module for transmitting information corresponding to the epochs; and b) a navigation module configured to:

i) derive a trajectory for the portable device for the first period of time based at least in part on the sensor data;

ii) obtain a map of a venue encompassing a trajectory derived for the portable device for the first period of time;

iii) obtain at a time subsequent to the first period of time a plurality of temporally unordered anchor points associated with the trajectory, wherein the unordered anchor points are derived from point of sale information;

iv) associate known positions of the plurality of anchor points with the map;

v) characterize turns of the trajectory;

vi) generate a plurality of candidate paths by comparing the characterized turns to the map;

vii) select a solution path from the plurality of candidate paths that corresponds to the plurality of anchor points; and viii) order the plurality of anchor points temporally based at least in part on the solution path, so that the plurality of anchor points are temporally ordered based at least in part on the motion sensor data.

40. The portable device of claim 39, wherein the sensor assembly includes an accelerometer and a gyroscope.

41. The portable device of claim 39, wherein the sensor assembly comprises an inertial sensor implemented as a Micro Electro Mechanical System (MEMS).

42. The server of claim 36, wherein the server is part of a system that further comprises a portable device for ordering a plurality of anchor points comprising:

an integrated sensor assembly, configured to output motion sensor data for the portable device representing motion of the portable device at a plurality of epochs over a first period of time, wherein the motion sensor data comprises data from at least one inertial sensor, wherein the mobility of the portable device is constrained or unconstrained within a platform and wherein the portable device may be tilted to any orientation, and a communications module for transmitting information corresponding to the epochs.

43. The portable device recited in claim 42, wherein the sensor assembly includes an accelerometer and a gyroscope.

44. The portable device recited in claim 42, wherein the sensor assembly comprises an inertial sensor implemented as a Micro Electro Mechanical System (MEMS).

45. The server of claim 36, wherein the server is part of a system that further comprises a portable device for ordering a plurality of anchor points comprising:

a) an integrated sensor assembly, configured to output motion sensor data for the portable device representing motion of the portable device at a plurality of epochs over a first period of time, wherein the motion sensor data comprises data from at least one inertial sensor, wherein the mobility of the portable device is constrained or unconstrained within a platform and wherein the portable device may be tilted to any orientation;

b) a navigation module configured to derive a trajectory for the portable device for the first period of time based at least in part on the sensor data; and c) a communications module for transmitting information corresponding to the epochs.

46. The portable device recited in claim 45, wherein the sensor assembly includes an accelerometer and a gyroscope.

47. The portable device recited in claim 45, wherein the sensor assembly comprises an inertial sensor implemented as a Micro Electro Mechanical System (MEMS).

* * * * *